United States Patent
Honda et al.

(10) Patent No.: US 11,299,020 B2
(45) Date of Patent: Apr. 12, 2022

(54) VEHICLE-BODY STRUCTURE OF VEHICLE

(71) Applicant: MAZDA MOTOR CORPORATION, Hiroshima (JP)

(72) Inventors: Masanori Honda, Hiroshima (JP); Tomohito Okuyama, Kure (JP); Takehisa Kohira, Hiroshima (JP); Ryuji Nonaka, Aki-gun (JP); Toshiyuki Gendo, Hiroshima (JP); Ken Ueki, Hiroshima (JP); Isamu Kizaki, Hiroshima (JP); Eri Kaiki, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 7 days.

(21) Appl. No.: 16/929,493

(22) Filed: Jul. 15, 2020

(65) Prior Publication Data

US 2021/0023923 A1 Jan. 28, 2021

(30) Foreign Application Priority Data

Jul. 23, 2019 (JP) .............................. JP2019-135518

(51) Int. Cl.
*B60J 5/04* (2006.01)
*B62D 25/20* (2006.01)
(Continued)

(52) U.S. Cl.
CPC ............ *B60J 5/0456* (2013.01); *B60J 5/0468* (2013.01); *B62D 25/04* (2013.01); *B62D 25/14* (2013.01);
(Continued)

(58) Field of Classification Search
CPC ........ B60J 5/0456; B60J 5/0468; B60J 5/045; B60J 5/0427; B60J 5/0443; B60J 5/0429;
(Continued)

(56) References Cited

U.S. PATENT DOCUMENTS

| 8,201,873 B2* | 6/2012 | Nishimura ............. B62D 25/14 296/193.06 |
| 2016/0152119 A1* | 6/2016 | Tanaka ................... B62D 25/04 296/193.05 |
| 2017/0313166 A1* | 11/2017 | Sugie ...................... E05B 83/38 |

FOREIGN PATENT DOCUMENTS

| DE | 10 2004 029 458 A1 | 1/2006 |
| EP | 1 418 076 A1 | 5/2004 |

(Continued)

OTHER PUBLICATIONS

The extended European search report issued by the European Patent Office dated Dec. 7, 2020, which corresponds to European Patent Application No. 20185912.1-1009 and is related to U.S. Appl. No. 16/929,493.

*Primary Examiner* — Joseph D. Pape
*Assistant Examiner* — Dana D Ivey
(74) *Attorney, Agent, or Firm* — Studebaker & Brackett PC

(57) ABSTRACT

There are provided a vehicle-body frame member forming an opening portion for entrance at a vehicle side part and a front side door provided so as to open and close the opening portion. The vehicle-body frame member comprises a side sill, the front side door comprises a door panel portion provided with an inner lower portion which overlaps with the side sill in a vehicle wide view and reinforcement portions provided at three side-portions of a peripheral part of the door panel portion which are continuous and include the inner lower portion such that the reinforcement portions overlap with the vehicle-body frame member in a vehicle side view.

12 Claims, 13 Drawing Sheets

(51) Int. Cl.
  *B62D 25/04*    (2006.01)
  *B62D 25/14*    (2006.01)
  *B62D 21/15*    (2006.01)
  *B62D 25/02*    (2006.01)

(52) U.S. Cl.
  CPC ............... *B62D 25/20* (2013.01); *B60J 5/045* (2013.01); *B60J 5/0427* (2013.01); *B60J 5/0429* (2013.01); *B60J 5/0443* (2013.01); *B60J 5/0458* (2013.01); *B62D 21/157* (2013.01); *B62D 25/02* (2013.01); *B62D 25/025* (2013.01)

(58) Field of Classification Search
  CPC ........ B60J 5/0458; B62D 25/04; B62D 25/14; B62D 25/20; B62D 21/157; B62D 25/02; B62D 25/025
  USPC ................................. 297/187.12; 296/187.12
  See application file for complete search history.

(56)           References Cited

FOREIGN PATENT DOCUMENTS

| EP | 3 025 888 A1 | 6/2016 |
| EP | 3 219 590 A1 | 9/2017 |
| JP | 2018052138 A | 4/2018 |
| WO | 2018/049319 A1 | 3/2018 |

\* cited by examiner

FIG. 6
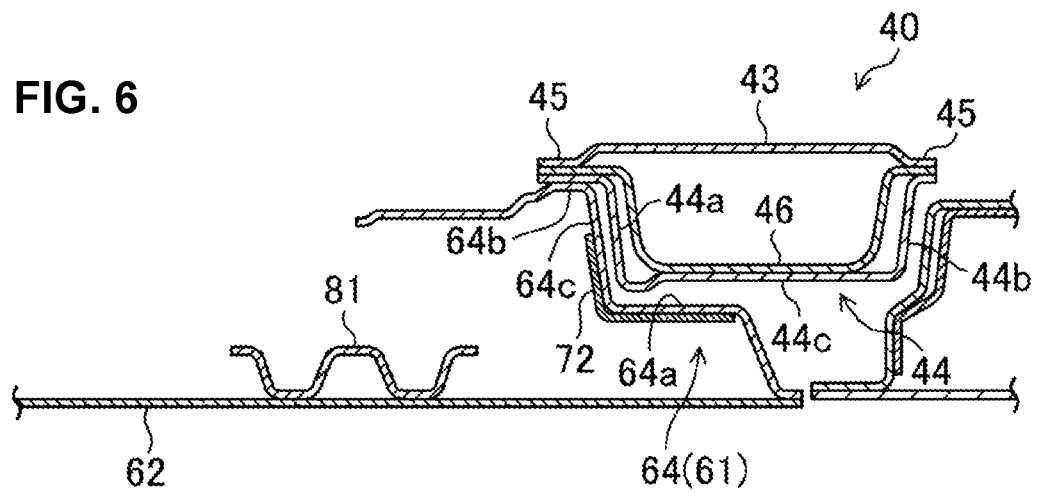
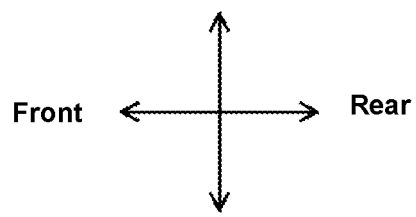
FIG. 7
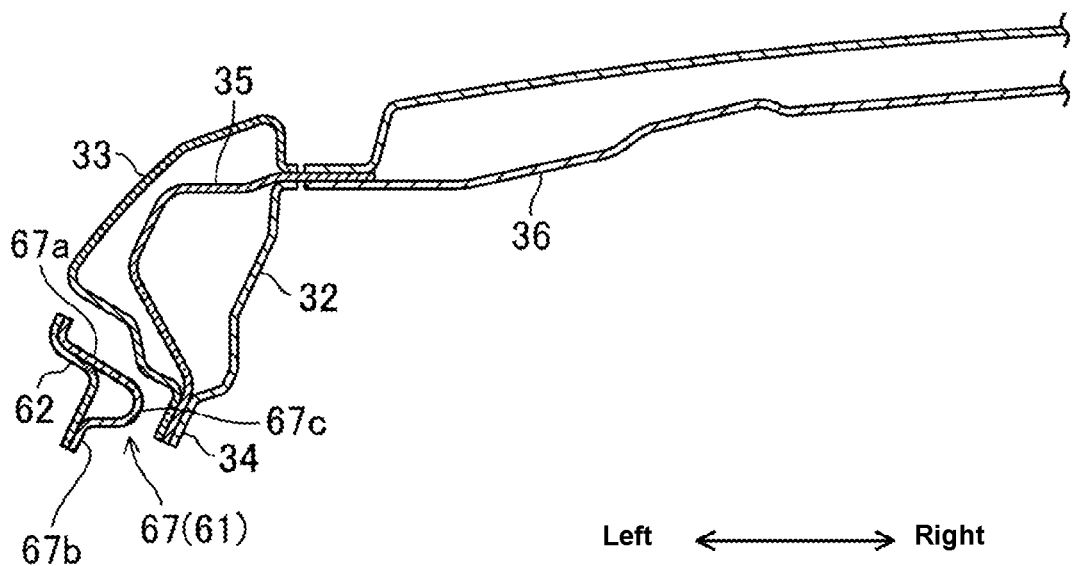

VEHICLE-BODY STRUCTURE OF VEHICLE

BACKGROUND OF THE INVENTION

The present invention relates to a vehicle-body structure of a vehicle.

Conventionally, in a vehicle which comprises a frame member forming an opening portion for entrance at a vehicle side part and a side door provided so as to open and close the opening portion, a structure of the side door to cope with a vehicle side collision has been developed (see Japanese Patent Laid-Open Publication No. 2018-52138, for example).

The above-described patent document discloses a door for a vehicle which is provided with panel portions which are arranged on a cabin inward side and on a cabin outward side, a frame portion which is arranged between the panel portions, and a reinforcement portion which is arranged at the frame portion, wherein the frame portion comprises front and rear parts which respectively extend in a vertical direction at front-side and rear-side portions of the panel portions and a lower part which interconnects respective lower portions of the front and rear parts, and the reinforcement portion comprises a first reinforcement which interconnects the above-described front and rear parts and a second reinforcement which interconnects the first reinforcement and the above-described lower part.

Herein, a vehicle-body structure of the vehicle is required to suppress a center pillar from coming into a cabin as much as possible in the vehicle side collision. Recently, weight reduction of the vehicle (light-weight vehicle) is also required from viewpoints of the fuel economy and the like. Therefore, it is necessary to compatibly attain the further weight reduction of the vehicle and increasing of the amount of absorption of the collision load (the collision-load absorption performance) in the vehicle side collision. In the door disclosed in the above-described patent document, however, since it is necessary to provide both the frame portion and the reinforcement portion, the weight is so increased that it may be difficult to satisfy the above-described requirements.

SUMMARY OF THE INVENTION

The present invention has been devised in view of the above-described matter, and an object of the present invention is to provide a vehicle-body structure of a vehicle which can compatibly attain the weight reduction of the vehicle and increasing of the amount of absorption of the collision load in the vehicle side collision.

The present invention is a vehicle-body structure of a vehicle, comprising a vehicle-body frame member forming an opening portion for entrance at a vehicle side part, and a side door provided so as to open and close the opening portion, wherein the vehicle-body frame member comprises a side sill, the side door comprises a door panel portion and a reinforcement portion provided at a peripheral part of the door panel portion such that the reinforcement portion overlaps with the vehicle-body frame member in a vehicle side view, the peripheral part of the door panel portion comprises a lower-side overlapping portion which overlaps with the side sill in the vehicle side view, and the reinforcement portion is provided at three side-portions of the peripheral part of the door panel portion which are continuous and include the lower-side overlapping portion.

That is, in the vehicle side collision, the side door is moved (pushed) toward the cabin and comes to contact the vehicle-body frame member. At this moment, the door panel portion receives a reaction load from the vehicle-body frame member in addition to the collision load. According to the present invention, since the reinforcement portion is positioned so as to overlap with the vehicle-body frame member in the vehicle side view (i.e., when viewed from the vehicle width direction), even if the door panel portion receives the collision load and the reaction load from the vehicle-body frame member, deformation of the peripheral part of the door panel portion is suppressed. Thereby, the deformation of the peripheral part of the door panel portion is suppressed in a quadrangular area including the above-described three side-portions which are continuous and include the lower-side overlapping portion. Accordingly, the door panel portion is suppressed from coming into the cabin. Therefore, the door panel portion remains contacting with the vehicle-body frame member. Consequently, the collision load of the vehicle side collision is transmitted from the side door to the vehicle-body frame member, being dispersed to a whole part of the door panel portion. Accordingly, the weight reduction of the vehicle and increasing of the amount of absorption of the collision load in the vehicle side collision can be compatibly attained.

In an embodiment of the present invention, the vehicle-body frame member comprises a floor cross member provided at a position which overlaps with the side sill in the vehicle side view and extending in a vehicle width direction, and the reinforcement portion is configured to overlap with the floor cross member in the vehicle side view.

According to this embodiment, since the floor cross member extends in the vehicle width direction, a portion of the side sill which overlaps with the floor cross member has high rigidity against the collision load applied from the vehicle side. Accordingly, if the lower-side reinforcement portion is configured to overlap with the floor cross member in the vehicle side view (i.e., when viewed from the vehicle width direction), the collision load of the vehicle side collision can be effectively transmitted to the vehicle-body frame member. Thereby, the amount of absorption of the collision load in the vehicle side collision can be further increased.

In another embodiment of the present invention, the vehicle-body frame member comprises a hinge pillar and an instrument-panel member provided at a position which overlaps with the hinge pillar in the vehicle side view and extending in the vehicle width direction, the peripheral part of the door panel portion comprises a front-side overlapping portion which overlaps with the hinge pillar and the instrument-panel member in the vehicle side view, and the reinforcement portion is provided at three side-portions of the peripheral part of the door panel portion which are continuous and include the lower-side overlapping portion and the front-side overlapping portion.

According to this embodiment, the reinforcement portion overlaps with the instrument-panel member in the vehicle side view (i.e., when viewed from the vehicle width direction). Since the instrument-panel member extends in the vehicle width direction, a portion of the hinge pillar which overlaps with the instrument-panel member has high rigidity against the collision load applied from the vehicle side. Accordingly, if the front-side reinforcement portion is configured to overlap with the instrument-panel member in the vehicle side view (i.e., when viewed from the vehicle width direction), the collision load of the vehicle side collision can be effectively transmitted to the vehicle-body frame member. Thereby, the amount of absorption of the collision load in the vehicle side collision can be more further increased.

In another embodiment of the present invention, the vehicle-body frame member comprises a center pillar, the peripheral part of the door panel portion comprises a center overlapping portion which overlaps with the center pillar in the vehicle side view, and the reinforcement portion is provided at three side-portions of the peripheral part of the door panel portion which are continuous and include the lower-side overlapping portion and the center overlapping portion.

In the vehicle side collision, a collision object often collides with an area of the vehicle including the center pillar. Therefore, according to this embodiment where the reinforcement portion is provided at the center overlapping portion, deformation of the center overlapping portion in the vehicle side collision is suppressed. Thereby, the collision load can be received by the center overlapping portion and the lower-side overlapping portion and transmitted to the vehicle-body frame member. Accordingly, even if the collision object collides with the area of the vehicle including the center pillar, the collision load is suppressed from being concentrated at the center pillar. Thereby, the amount of absorption of the collision load in the vehicle side collision can be further increased.

In another embodiment of the present invention, the center overlapping portion overlaps with a central part, in a vertical direction, of the center pillar, and the reinforcement portion provided at the center overlapping portion extends so as to include a position of the center overlapping portion which overlaps with the central part, in the vertical direction, of the center pillar.

According to this embodiment, since the reinforcement portion extends so as to include the position of the center overlapping portion which overlaps with the central part, in the vertical direction, of the center pillar, the collision load of the vehicle side collision can be effectively transmitted to an upper-side part of the center pillar. Thereby, the amount of absorption of the collision load in the vehicle side collision can be more further increased.

In another embodiment of the present invention, the side door further comprises an impact bar attached to the door panel portion and extending in a vehicle longitudinal direction, and the reinforcement portion is configured to include an attachment portion of the impact bar to the door panel portion.

According to this embodiment, since the impact bar is provided, the collision load can be absorbed by deformation of the impact bar in the vehicle side collision. Meanwhile, the collision load tends to be concentrated at the attachment portion of the impact bar to the door panel portion. Therefore, by configuring the reinforcement portion to include the attachment portion of the impact bar to the door panel portion, deformation of the attachment portion can be suppressed even if the collision load is concentrated at the attachment portion. Thereby, the amount of absorption of the collision load in the vehicle side collision can be more further increased.

The present invention will become apparent from the following description which refers to the accompanying drawings.

BRIEF DESCRIPTION OF THE DRAWINGS

FIG. 6 is a sectional view taken along line VI-VI of FIG. 3.

FIG. 7 is a sectional view taken along line VII-VII of FIG. 1.

DETAILED DESCRIPTION OF THE INVENTION

Figure 1:
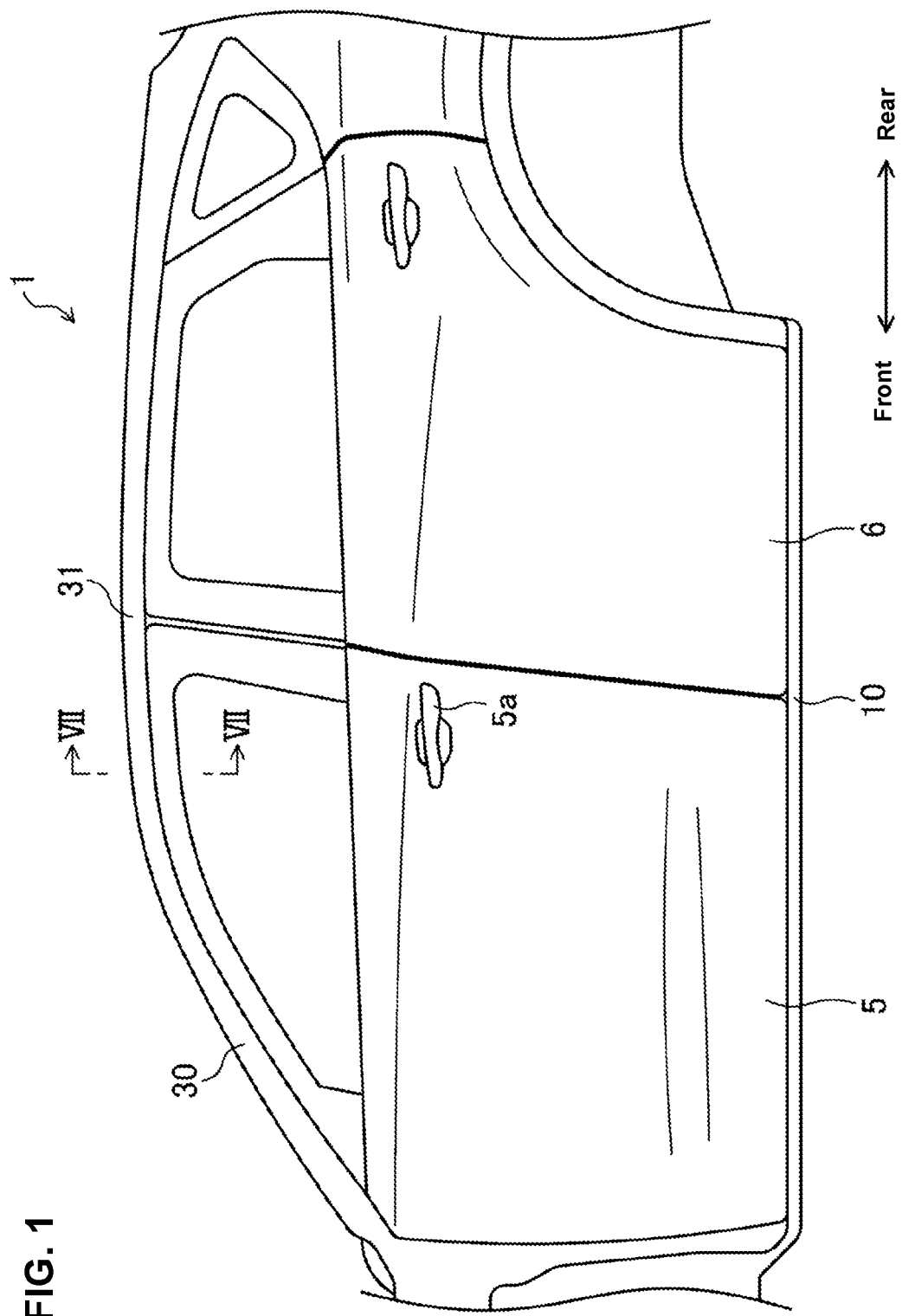
FIG. 1 is a side view showing a left-side side part of a vehicle provided with a vehicle-body structure of the vehicle according to an embodiment of the present invention, which shows around a front side door.

Hereafter, an embodiment of the present invention will be described referring to the drawings. In the following description, front, rear, left, right, upper and lower which respectively mean directions relative to a vehicle 1 will be simply referred to as "front," "rear," "left," "right," "upper," and "lower."

FIG. 1 shows a left-side side part of the vehicle 1 to which a vehicle-body structure according to the present embodiment is applied. The vehicle 1 is a 4-door type of passenger car. In the present embodiment, since the vehicle-body structure of the vehicle 1 is configured to be laterally symmetrical, the vehicle-body structure of the left-side part of the vehicle 1 will be described specifically only, and detailed explanation of the one of a right-side part of the vehicle 1 will be omitted. Further, in the following description, there is a case where an inward side, in a vehicle width direction, of the vehicle 1 will be simply referred to as "right side" and also an outward side, in the vehicle width direction, of the vehicle 1 will be simply referred to as "left side."

The vehicle 1 comprises a vehicle-body frame member 2 which forms front-side and rear-side opening portions for entrance 3, 4 at its left-side side part, through which a passenger gets on or gets off. A front side door 5 is arranged at the front-side opening portion 3 so as to open and close this opening portion 3. A rear side door 6 is arranged at the rear-side opening portion 4 so as to open and close this opening portion 4.

Figure 2:
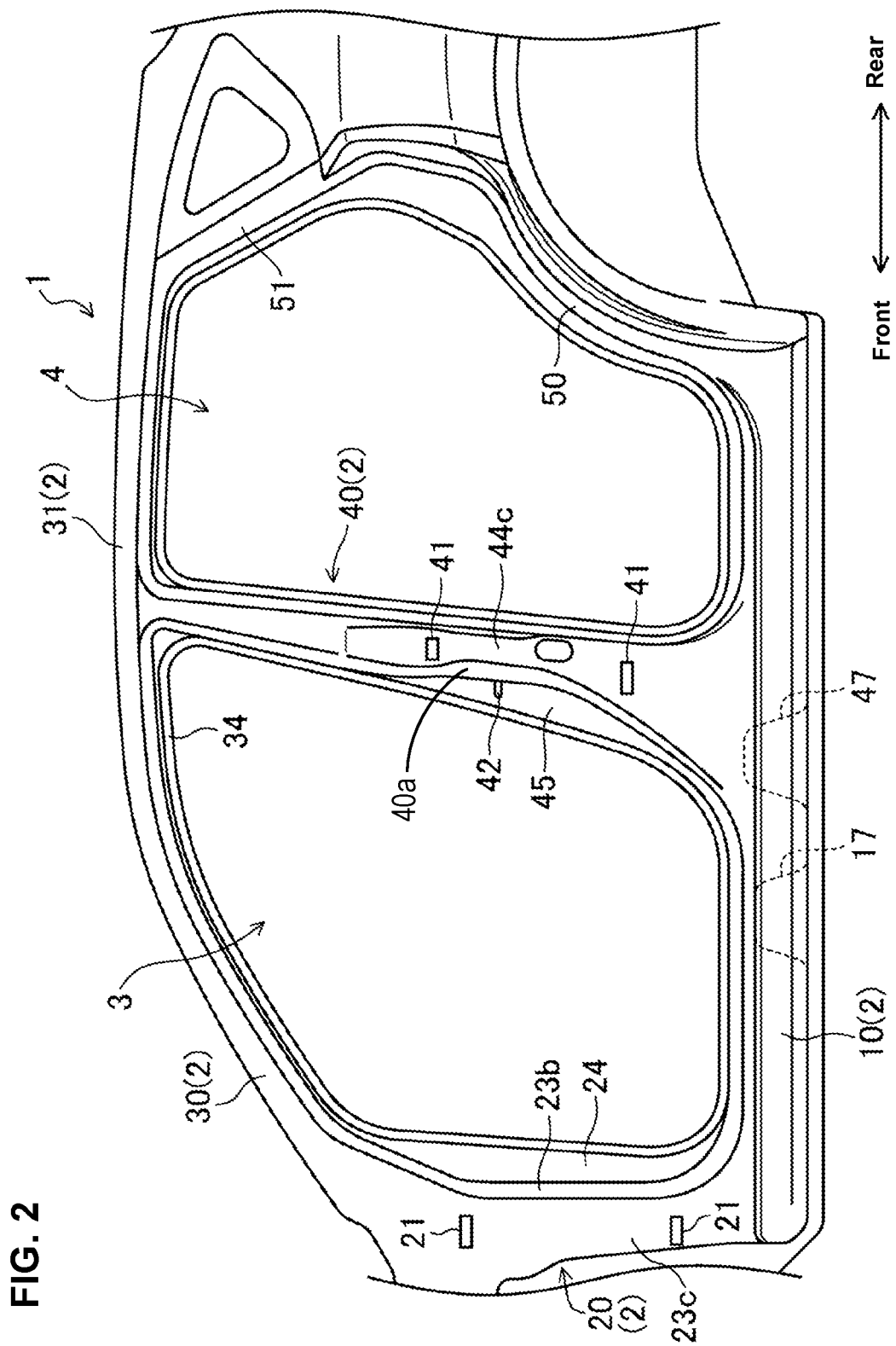
FIG. 2 is a side view showing a vehicle-body frame member at the left-side side part of the vehicle.

The vehicle-body frame member 2 comprises, as shown in FIG. 2, a side sill 10 which is arranged at a lower part of the vehicle 1 and extends in a longitudinal direction, a hinge pillar 20 which extends upwardly from a front-side end portion of the side sill 10, a front pillar 30 which extends obliquely rearwardly-and-upwardly from an upper-side end portion of the hinge pillar 20, and a roof side rail 31 which continuously extends rearwardly from a rear-side end portion of the front pillar 30. The vehicle-body frame member 2 further comprises a center pillar 40 which extends in a vertical direction and interconnects a central part, in the longitudinal direction, of the side sill 10 and a central part, in the longitudinal direction, of the roof side rail 31. The front-side opening portion 3 is partitioned by the side sill 10, the hinge pillar 20, the front pillar 30, the roof side rail 31, and the center pillar 40.

Further, the vehicle-body frame member 2 comprises a wheel arch 50 which extends upwardly-and-rearwardly in an arch shape from a rear-side end portion of the side sill 10 and forms a part of a wheel house and a quarter pillar 51 which extends vertically and interconnects the wheel arch 50 and the roof side rail 31. The rear-side opening portion 4 is partitioned by the side sill 10, the roof side rail 31, the center pillar 40, the wheel arch 50, and the quarter pillar 51.

Figure 4:
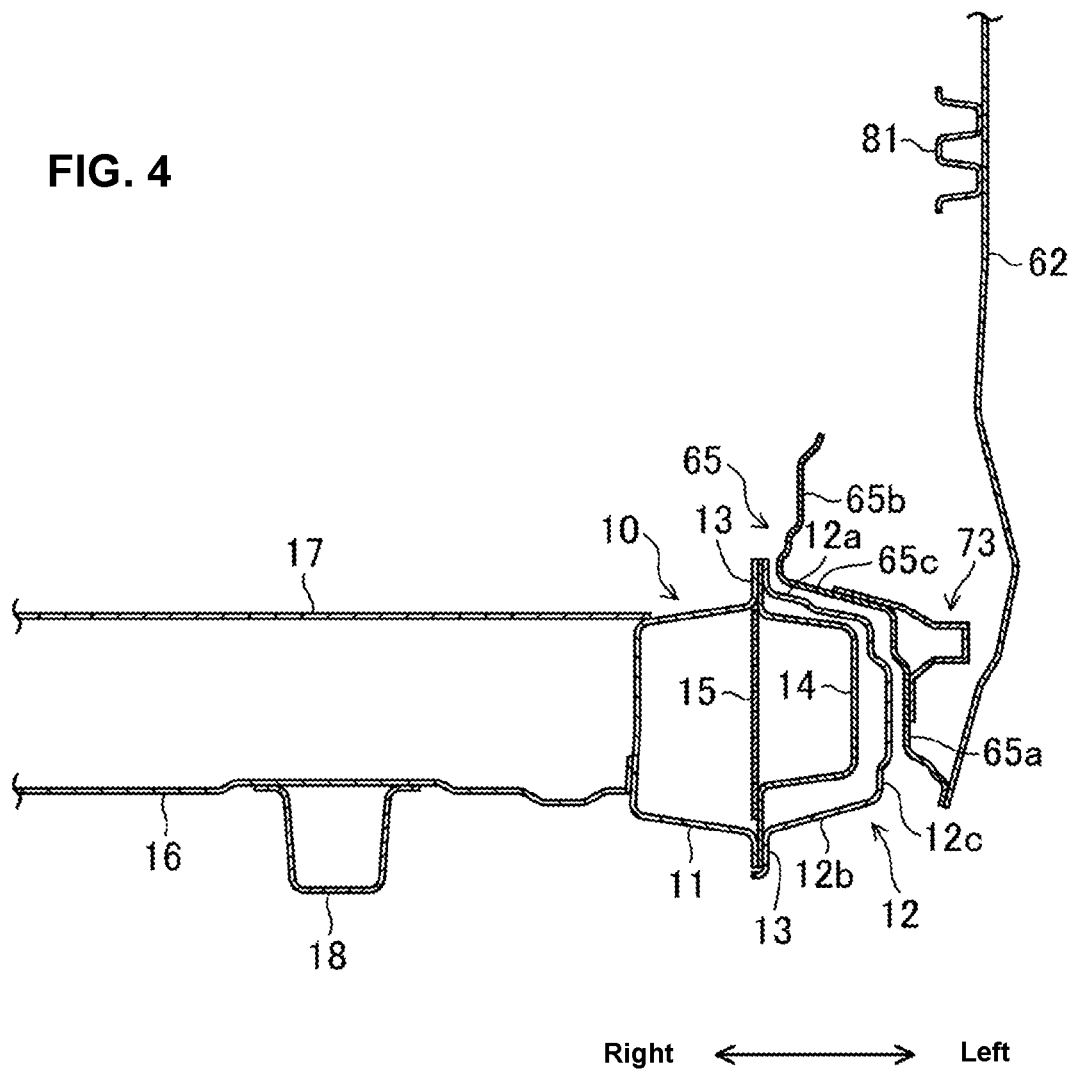
FIG. 4 is a sectional view taken along line IV-IV of FIG. 3.

The side sill 10 comprises, as shown in FIG. 4, a side-sill inner panel 11 which is positioned on the inward side, in the vehicle width direction, of the vehicle 1 (on the right side in this figure) and has a hat-shaped cross section and a side-sill outer panel 12 which is positioned on the outward side, in the vehicle width direction, of the vehicle 1 (on the left side in this figure) and has a hat-shaped cross section. The cross section of the side-sill inner panel 11 is opened to the left side, and the cross section of the side-sill outer panel 12 is opened to the right side. Each of the side-sill inner panel 11 and the side-sill outer panel 12 has side-sill flanges 13 which extend in the vertical direction and in the longitudinal direction at its upper-side end portion and its lower-side end portion. The respective side-sill flanges 13 overlap with each other in the vehicle width direction and are welded together. Thus, a closed-cross section is formed by the side-sill inner panel 11 and the side-sill outer panel 12.

The side-sill outer panel 12 comprises, as shown in FIG. 4, a side-sill upper wall portion 12a which extends toward the left side from a lower-side end portion of the upper-side side-sill flange 13, a side-sill lower wall portion 12b which extends, facing the side-sill upper wall portion 12a in the vertical direction, and a side-sill side wall portion 12c which interconnects a left-side end portion of the side-sill upper wall portion 12a and a left-side end portion of the side-sill lower wall portion 12b in the vertical direction.

A first side-sill reinforcement 14 and a second side-sill reinforcement 15 are provided inside the side sill 10. The first side-sill reinforcement 14 is configured to have a hat-shaped cross section which is opened to the right side, and arranged along the side-sill outer panel 12. The second side-sill reinforcement 15 is of a flat plate shape. Respective end portion, in the vertical direction, of the first side-sill reinforcement 14 overlap with the respective side-sill flanges 13 in the vehicle width direction and are welded together with the side-sill flanges 13. The second side-sill reinforcement 15 is welded to a right side of the first side-sill reinforcement 14.

As shown in FIG. 4, a left-side end portion of a floor panel 16 which expands in the longitudinal direction and in the vehicle width direction is joined to a lower-side portion of the side-sill inner panel 11. Further, a left-side end portion of a first floor cross member 17 which extends in the vehicle width direction is joined to an upper-side portion of the side-sill inner panel 11. A floor side rail 18 which extends in the longitudinal direction is joined to a lower face of the floor panel 16.

The hinge pillar 20 comprises two front-door hinges 21 to support the front side door 5. The two front-door hinges 21 are provided to be spaced apart from each other in the vertical direction.

Figure 5:
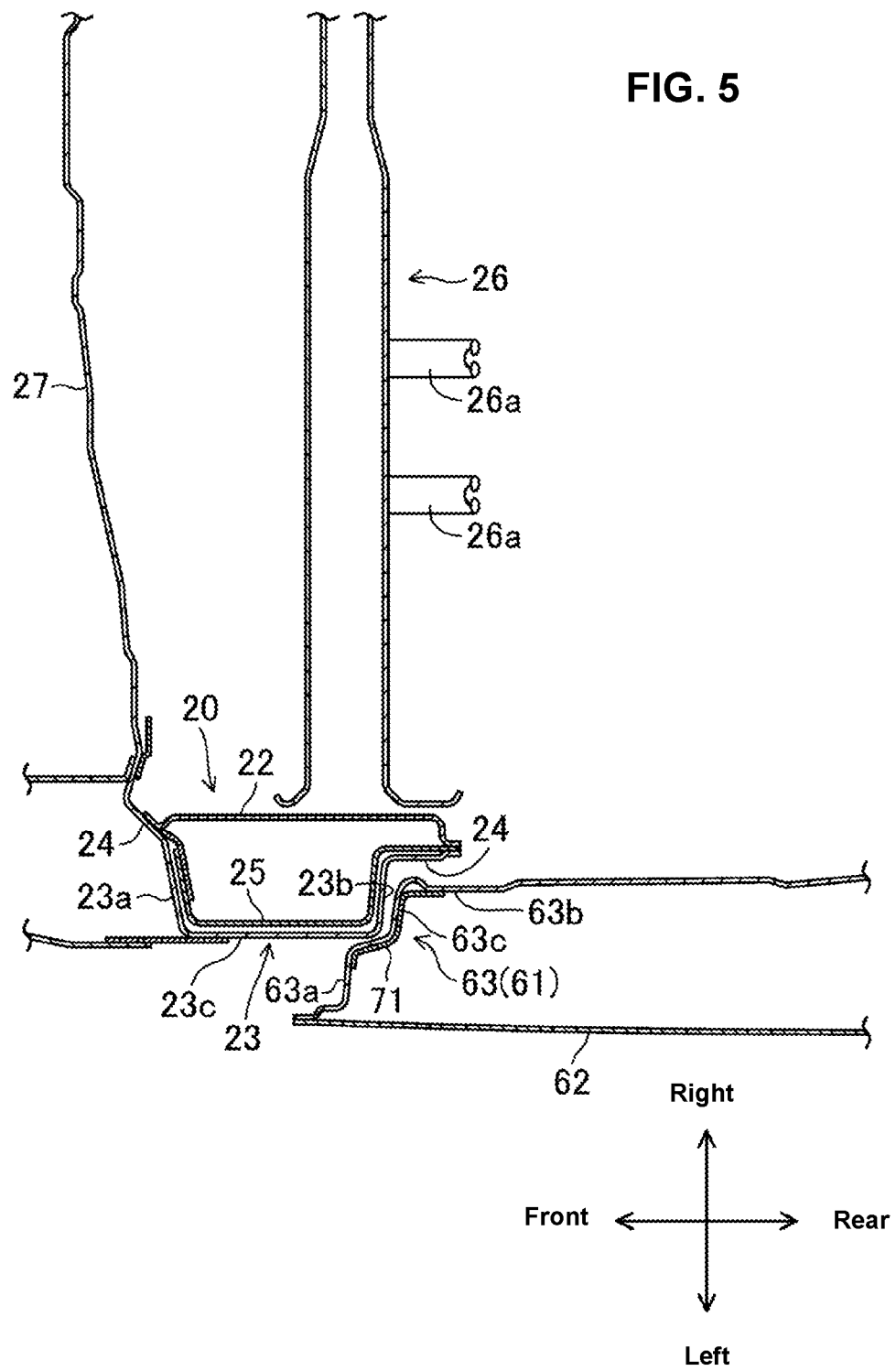
FIG. 5 is a sectional view taken along line V-V of FIG. 3.

The hinge pillar 20 comprises, as shown in FIG. 5, a hinge-pillar inner panel 22 which is positioned on the inward side, in the vehicle width direction, of the vehicle 1 (on the right side in this figure) and has a hat-shaped cross section and a hinge-pillar outer panel 23 which is positioned on the outward side, in the vehicle width direction, of the vehicle 1 (on the left side in this figure) and has a hat-shaped cross section. The cross section of the hinge-pillar inner panel 22 is opened to the left side, and the cross section of the hinge-pillar outer panel 23 is opened to the right side. Each of the hinge-pillar inner panel 22 and the hinge-pillar outer panel 23 has hinge-pillar flanges 24 which extend in the vertical direction and in the longitudinal direction at its front-side end portion and its rear-side end portion. The respective hinge-pillar flanges 24 overlap with each other in the vehicle width direction and are welded together. Thus, a closed-cross section is formed by the hinge-pillar inner panel 22 and the hinge-pillar outer panel 23.

The hinge-pillar outer panel 23 comprises, as shown in FIG. 5, a hinge-pillar front wall portion 23a which extends toward the left side from a rear-side end portion of the upper-side hinge-pillar flange 24, a hinge-pillar rear wall portion 23b which extends, facing the hinge-pillar front wall portion 23a in the longitudinal direction, and a hinge-pillar side wall portion 23c which interconnects a left-side end portion of the hinge-pillar front wall portion 23a and a left-side end portion of the hinge-pillar rear wall portion 23b in the longitudinal direction.

A hinge-pillar reinforcement 25 is provided inside the hinge pillar 20. The hinge-pillar reinforcement 25 is configured to have a hat-shaped cross section which is opened to the right side, and arranged along the hinge-pillar outer panel 23. Respective end portions, in the longitudinal direction, of the hinge-pillar reinforcement 25 overlap with the respective hinge-pillar flanges 24 in the vehicle width direction and are welded together with the hinge-pillar flanges 24. Herein, in FIG. 5, the front-side end portion of the hinge-pillar reinforcement 25 does not overlap with the hinge-pillar flange 24. At another part of the hinge-pillar reinforcement 25, however, the front-side end portion of the hinge-pillar reinforcement 25 overlaps with the hinge-pillar flanges 24 as well.

As shown in FIG. 5, a left-side end portion of an instrument-panel member 26 is joined to the hinge-pillar inner panel 22. The instrument-panel member 26 is provided with hinges 26a to pivotably support a glove box in the vertical direction and others. A dash panel 27 which partitions a cabin from an engine room is joined to a front-side end portion of the hinge-pillar inner panel 22.

The center pillar 40 is provided with two rear-door hinges 41 to support the openable rear side door 6. The two rear-door hinges 41 are provided to be spaced apart from each other in the vertical direction. The center pillar 40 is further provided with a striker 42 at its front-side position which is located slightly below the upper-side rear-door hinge 41. The striker 42 is fixed to a central part 40a, in the vertical direction, of the center pillar 40. The striker 42 is a member to lock the front side door 5 in a closed state through its engagement with a door latch 5b of the front side door 5 (see FIG. 3).

The center pillar 40 comprises, as shown in FIG. 6, a center-pillar inner panel 43 which is positioned on the inward side, in the vehicle width direction, of the vehicle 1 (on the right side in this figure) and has a hat-shaped cross section and a center-pillar outer panel 44 which is positioned on the outward side, in the vehicle width direction, of the vehicle 1 (on the left side in this figure) and has a hat-shaped cross section. The cross section of the center-pillar inner panel 43 is opened to the left side, and the cross section of the center-pillar outer panel 44 is opened to the right side. Each of the center-pillar inner panel 43 and the center-pillar outer panel 44 has center-pillar flanges 45 which extend in the vertical direction and in the longitudinal direction at its front-side end portion and its rear-side end portion. The respective center-pillar flanges 45 overlap with each other in the vehicle width direction and are welded together. Thus, a closed-cross section is formed by the center-pillar inner panel 43 and the center-pillar outer panel 44.

The center-pillar outer panel 44 comprises, as shown in FIG. 6, a center-pillar front wall portion 44a which extends toward the left side from a rear-side end portion of the front-side center-pillar flange 45, a center-pillar rear wall portion 44b which extends, facing the center-pillar front wall portion 44a in the longitudinal direction, and a center-pillar side wall portion 44c which interconnects a left-side end portion of the center-pillar front wall portion 44a and a left-side end portion of the center-pillar rear wall portion 44b in the longitudinal direction.

A center-pillar reinforcement 46 is provided inside the center pillar 40. The center-pillar reinforcement 46 is configured to have a hat-shaped cross section which is opened to the right side, and arranged along the center-pillar outer panel 44. Respective end portion, in the longitudinal direction, of the center-pillar reinforcement 46 overlap with the respective center-pillar flanges 45 in the vehicle width direction and are welded together with the center-pillar flanges 45.

As shown in FIG. 2, a lower-side end portion of the center pillar 40 is located at the same position as a second floor cross member 47 which extends in the vehicle width direction.

The roof side rail 31 comprises, as shown in FIG. 7, a roof-side inner panel 32 which is positioned on the inward side, in the vehicle width direction, of the vehicle 1 (on the right side in this figure) and a roof-side outer panel 33 which is positioned on the outward side, in the vehicle width direction, of the vehicle 1 (on the left side in this figure) and has a C-shaped cross section. The cross section of the roof-side outer panel 33 is opened to the right side. The roof-side outer panel 33 has a roof-side flange 34 which extends in the vertical direction and in the longitudinal direction at its lower-side end portion. The roof-side flange 34 overlaps with a lower-side end portion of the roof-side inner panel 32 in the vehicle width direction and these are welded together. An upper-side end portion of the roof-side outer panel 33 overlaps with an upper-side end portion of the roof-side inner panel 32 in the vehicle width direction and these are welded together. Thus, a closed-cross section is formed by the roof-side inner panel 32 and the roof-side outer panel 33.

A roof-side reinforcement 35 is provided inside the roof side rail 31. The roof-side reinforcement 35 is configured to have a hat-shaped cross section which is opened to the right side, and arranged along the roof-side outer panel 33. A lower-side end portion of the roof-side reinforcement 35 overlaps with a lower-side end portion of the roof-side inner panel 32 and the roof-side flange 34 of the roof-side outer panel 33 in the vehicle width direction and these are welded together. Meanwhile, an upper-side end portion of the roof-side reinforcement 35 overlaps with an upper-side end portion of the roof-side inner panel 32 and an upper-side end portion of the roof-side outer panel 33 in the vehicle width direction and these are welded together.

As shown in FIG. 7, a roof cross member 36 which extends in the vehicle width direction is provided on the right side of the roof side rail 31. A left-side end portion of the roof cross member 36 is joined to the roof side rail 31.

Next, the front side door 5 will be described as an example of a side-door structure. In the following description, a state where the front side door 5 closes the front-side opening portion 3 is a premise. Herein, while detailed description of the rear side door 6 is omitted, the rear side door 6 has substantially the same structure as the front side door 5 except a shape of a door panel portion 60 and a shape of a reinforcement portion, which will be described later.

The front side door 5 comprises, as shown in FIGS. 4-8, the door panel portion 60 which has a door inner panel 61 which is positioned on the inward side, in the vehicle width direction, of the vehicle (on the right side in this figure) and a door outer panel 62 which is positioned on the outward side, in the vehicle width direction, of the vehicle (on the left side in this figure). The door inner panel 61 and the door outer panel 62 are welded together so as to have a closed-cross section formed thereby. A door trim is joined to a face of the door inner panel 61 which is opposite to the door outer panel 62.

Figure 3:
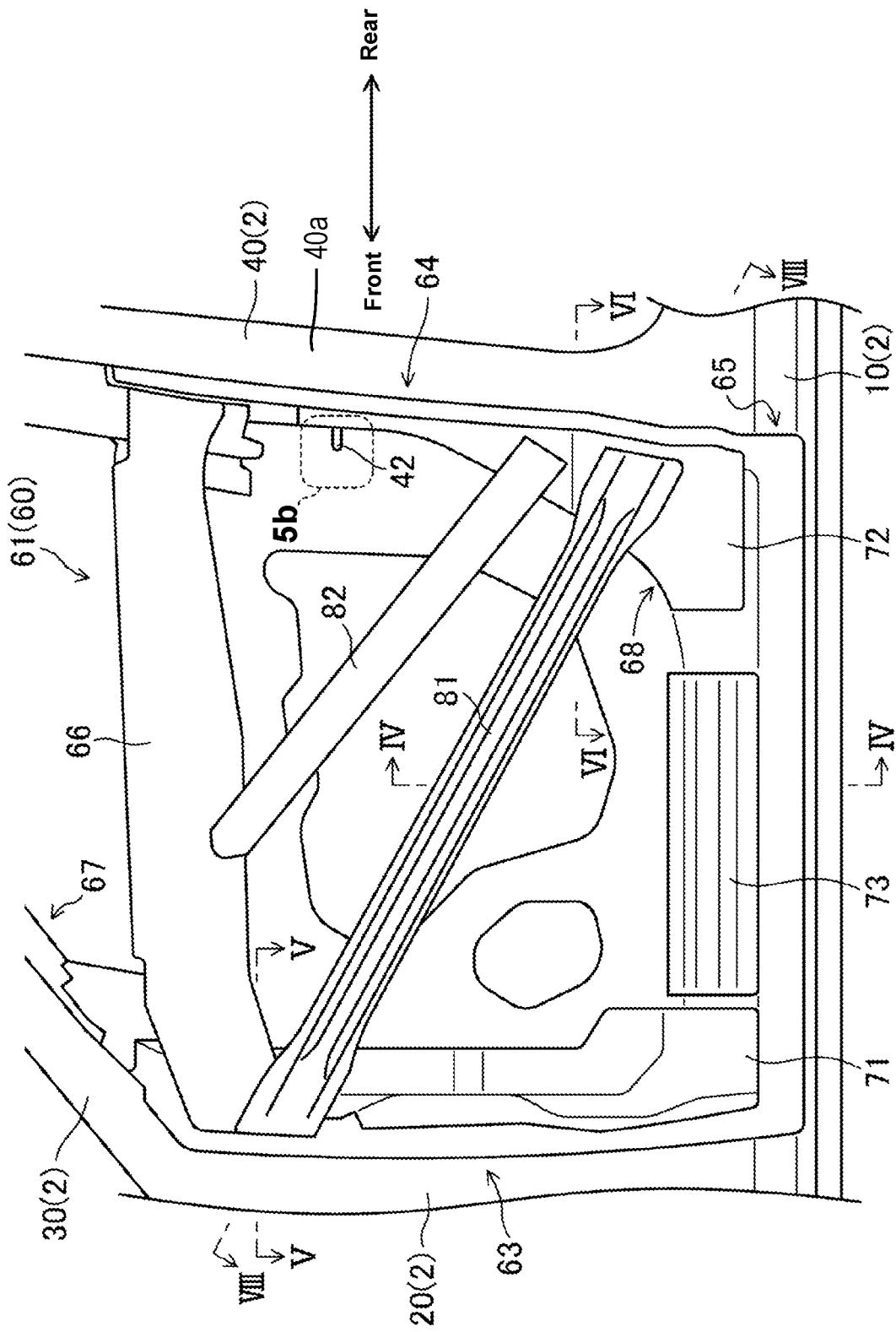
FIG. 3 is a side view showing a state where an outer panel of the front side door is removed, when viewed from a vehicle left side.

The door inner panel 61 is made of a single-sheet steel plate. The door inner panel 61 is formed along a periphery of the front-side opening portion 3 as shown in FIG. 3. The door inner panel 61 comprises an inner front portion 63 which extends in the vertical direction along the hinge pillar 20, an inner rear portion 64 which extends in the vertical direction along a lower part of the center pillar 40, and an inner lower portion 65 which extends along the side sill 10 and interconnects a lower-side end portion of the inner front portion 63 and a lower-side end portion of the inner rear portion 64. The door inner panel 61 further comprises a beltline portion 66 which extends straightly in the longitudinal direction and interconnects an upper-side end portion of the inner front portion 63 and an upper-side end portion of the inner rear portion 64. The door inner panel 61 further comprises a window frame portion 67 which forms a quarter-window opening portion which is closed with a window glass. A corner portion between the inner rear portion 64 and the inner lower portion 65 of the door inner panel 61 is configured as a curved portion 68 which is curved smoothly from the inner rear portion 64 toward the inner lower portion 65.

The inner front portion 63 comprises, as shown in FIG. 5, a front-side outer wall portion 63a which is positioned at the outside, in a surface direction, of the door inner panel 61 (on the front side in this figure), a front-side inner wall portion 63b which is positioned on the inside, in the surface direction, (on the rear side in this figure) of the front-side outer wall portion 63a, and a front-side connection wall portion 63c which interconnects the front-side outer wall portion 63a and the front-side inner wall portion 63b in the vehicle width direction. The front-side outer wall portion 63a comprises a part which expands in the longitudinal direction and in the vertical direction and another part which expands in the vehicle width direction and in the vertical direction continuously from a front-side end portion of the above-described part. The front-side inner wall portion 63b expands in the longitudinal direction and in the vertical direction. The front-side connection wall portion 63c expands in the vehicle width direction and in the vertical direction so as to interconnect a rear-side end portion of the front-side outer wall portion 63a and a front-side end portion of the front-side inner wall portion 63b. The front-side outer wall portion 63a extends in the vertical direction such that this portion 63a overlaps with the rear-side hinge-pillar flange 24 and the hinge-pillar side wall portion 23c of the hinge pillar 20 in the vehicle side view (i.e., when viewed from the vehicle width direction). The front-side inner wall portion 63b extends in the vertical direction such that this portion 63b overlaps with the rear-side hinge-pillar flange 24 of the hinge pillar 20 in the vehicle side view (i.e., when viewed from the vehicle width direction). The inner front portion 63 forms a front-side overlapping portion which overlaps with the hinge pillar 20 in the vehicle side view.

The inner rear portion 64 comprises, as shown in FIG. 6, a rear-side outer wall portion 64a which is positioned at the outside, in a surface direction, of the door inner panel 61 (on the rear side in this figure), a rear-side inner wall portion 64b which is positioned on the inside, in the surface direction, (on the front side in this figure) of the rear-side outer wall portion 64a, and a rear-side connection wall portion 64c which interconnects the rear-side outer wall portion 64a and the rear-side inner wall portion 64b in the vehicle width direction. The rear-side outer wall portion 64a comprises a part which expands in the longitudinal direction and in the vertical direction and another part which expands in the vehicle width direction and in the vertical direction continuously from a rear-side end portion of the above-described part. The rear-side inner wall portion 64b expands in the longitudinal direction and in the vertical direction. The rear-side connection wall portion 64c expands in the vehicle width direction and in the vertical direction so as to interconnect a front-side end portion of the rear-side outer wall portion 64a and a rear-side end portion of the rear-side inner wall portion 64b. A ridgeline is formed between the rear-side connection wall portion 64c and the rear-side outer wall portion 64a. The rear-side outer wall portion 64a extends in the vertical direction such that this portion 64a overlaps with the front-side center-pillar flange 45 and the center-pillar side wall portion 44c of the center pillar 40 in the vehicle side view (i.e., when viewed from the vehicle width direction). The rear-side inner wall portion 64b extends in the vertical direction such that this portion 64b overlaps with the front-side center-pillar flange 45 of the center pillar 40 in the vehicle side view (i.e., when viewed from the vehicle width direction).

The inner rear portion 64 is configured to overlap with the central part 40a, in the vertical direction, of the center pillar 40 in the vehicle side view (i.e., when viewed from the vehicle width direction). The inner rear portion 64 forms a center overlapping portion which overlaps with the center pillar 40 in the vehicle side view.

The door latch 5b engaging with the striker 42 is provided at a part of the inner rear portion 64 which corresponds to the striker 42. The door latch 5b is provided at a position of the inner rear portion 64 which overlaps with the central part 40a, in the vertical direction, of the center pillar 40. The door latch 5b causes the front side door 5 to engage with the center pillar 40 through its engagement with the striker 42. The door latch 5b is configured to control an engagement state with the striker 42 by operating a door handle 5a (see FIG. 1).

The inner lower portion 65 comprises, as shown in FIG. 4, a lower-side outer wall portion 65a which is positioned at the outside, in the surface direction, of the door inner panel 61 (on the lower side in this figure), a lower-side inner wall portion 65b which is positioned on the inside, in the surface direction, (on the upper side in this figure) of the lower-side outer wall portion 65a, and a lower-side connection wall portion 65c which interconnects the lower-side outer wall portion 65a and the lower-side inner wall portion 65b in the vehicle width direction. The lower-side outer wall portion 65a and the lower-side inner wall portion 65b expand in the longitudinal direction and in the vertical direction. The lower-side connection wall portion 65c expands in the vehicle width direction and in the longitudinal direction so as to interconnect an upper-side end portion of the lower-side outer wall portion 65a and a lower-side end portion of the lower-side inner wall portion 65b. A ridgeline is formed between the lower-side connection wall portion 65c and the lower-side outer wall portion 65a. The lower-side outer wall portion 65a extends in the longitudinal direction such that this portion 65a overlaps with the upper-side side-sill flange 13 and the side-sill side wall portion 12c of the side sill 10 in the vehicle side view (i.e., when viewed from the vehicle width direction). The lower-side inner wall portion 65b extends in the longitudinal direction such that this portion 65b overlaps with the upper-side side-sill flange 13 of the side sill 10 in the vehicle side view (i.e., when viewed from the vehicle width direction). The inner lower portion 65 forms a lower-side overlapping portion which overlaps with the side sill 10 in the vehicle side view.

The window frame portion 67 comprises, as shown in FIG. 7, an upper-side outer wall portion 67a which is positioned at the outside, in the surface direction, of the door inner panel 61 (on the upper side in this figure), an upper-side inner wall portion 67b which is positioned on the inside, in the surface direction, (on the lower side in this figure) of the upper-side outer wall portion 67a, and an upper-side connection wall portion 67c which interconnects the upper-side outer wall portion 67a and the upper-side inner wall portion 67b in the vertical direction and in the vehicle width direction. The upper-side outer wall portion 67a expands in the longitudinal direction and in the vehicle width direction and slants downwardly toward the right side. The upper-side inner wall portion 67b expands in the longitudinal direction and in the vertical direction. The lower-side connection wall portion 65c is curved downwardly toward the left side from a right-side end portion of the upper-side outer wall portion 67a so as to interconnect a right-side end portion of the upper-side outer wall portion 67a and an upper-side end portion of the upper-side inner wall portion 67b. The upper-side outer wall portion 67a and the upper-side connection portion 67c extend such that they overlap with the roof-side flange 34 in the vehicle sideview (i.e., when viewed from the vehicle width direction).

As shown in FIG. 3, a first impact bar 81 and a second impact bar 82 are attached to the door inner panel 61. The first impact bar 81 extends obliquely rearwardly-and-downwardly and interconnects an upper-side end portion of the inner front portion 63 and a lower-side end portion of the inner rear portion 64. The second impact bar 82 extends obliquely rearwardly-and-downwardly so as to interconnect a middle part, in the longitudinal direction, of the beltline portion 66 and a middle part, in the vertical direction, of the inner rear portion 64. The first impact bar 81 is configured such that both-side end portions, in the longitudinal direction, thereof have a hat-shaped cross section and a middle portion, in the longitudinal direction, thereof has an M-shaped cross section as shown in FIGS. 4 and 6.

As shown in FIGS. 3-8, plural reinforcement portions are provided at a peripheral portion of the door inner panel 61. Specifically, the reinforcement portions are provided at three side-portions of the peripheral part of the door panel portion 60 which are continuous and include the inner lower portion 65. More specifically, the reinforcement portions comprise a front-side reinforcement portion 71 which is provided along the inner front portion 63, a rear-side reinforcement portion 72 which is provided along the inner rear portion 64, and a lower-side reinforcement portion 73 which is provided along the inner lower portion 65. The reinforcement portions 71-73 may be made of a plate member which is made from hot material, for example.

The front-side reinforcement portion 71 is a patch member which is attached along the front-side outer wall portion 63a, the front-side inner wall portion 63b, and the front-side connection wall portion 63c as shown in FIG. 3. That is, the front-side reinforcement portion 71 is provided to straddle a ridgeline between the front-side outer wall portion 63a and the front-side connection wall portion 63c. The front-side reinforcement portion 71 is, as shown in FIG. 5, provided to overlap with the hinge-pillar side wall portion 23c of the hinge pillar 20 in the vehicle side view (i.e., when viewed from the vehicle width direction). Further, the front-side reinforcement portion 71 is provided to overlap with the instrument-panel member 26 in the vehicle side view (i.e., when viewed from the vehicle width direction).

Figure 8:
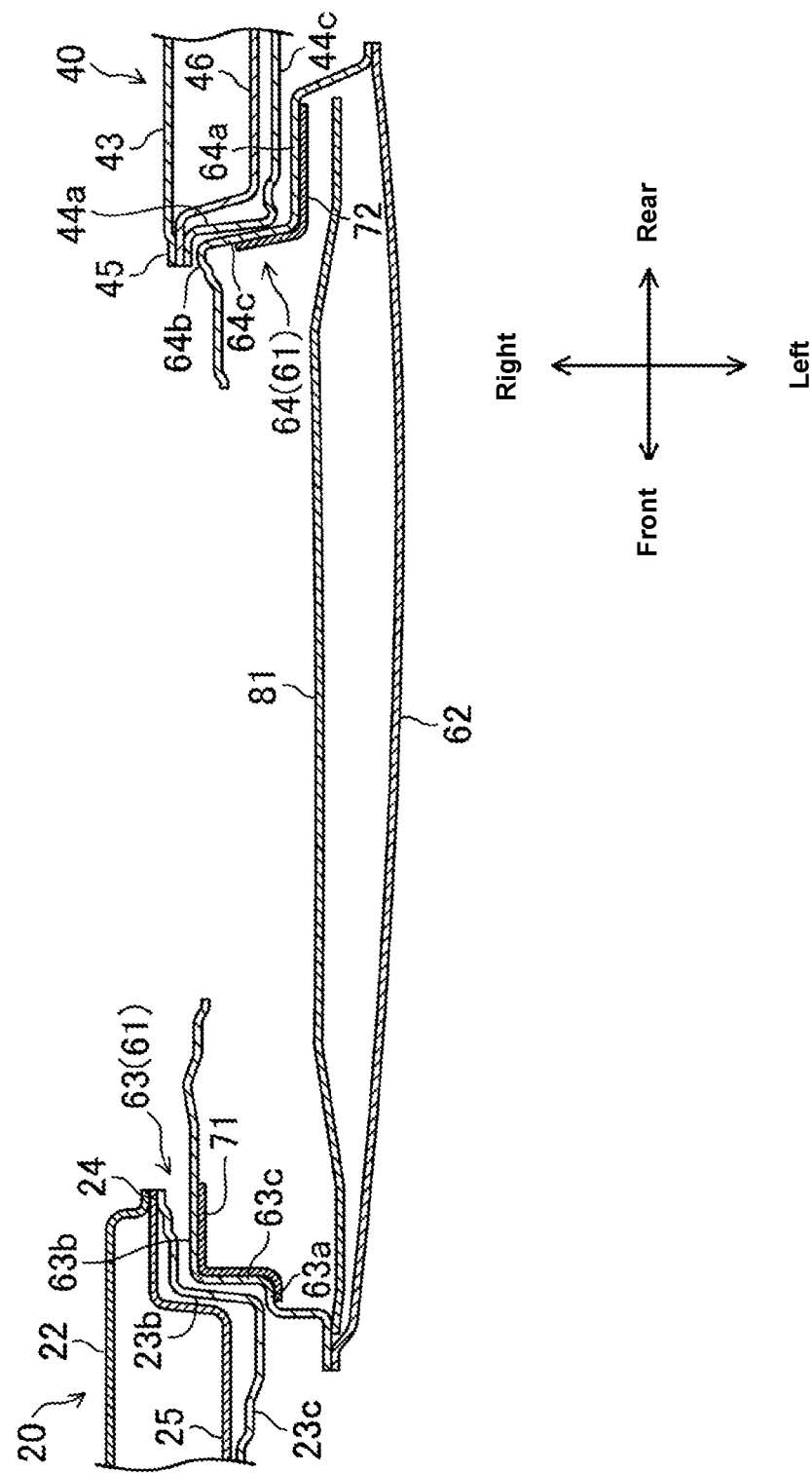
FIG. 8 is a sectional view taken along line VIII-VIII of FIG. 3.

The front-side reinforcement portion 71 is provided to overlap with an upper-side end portion of the first impact bar 81 in the vehicle side view (i.e., when viewed from the vehicle width direction) as shown in FIGS. 3 and 8. The front-side reinforcement portion 71 is welded to the inner front portion 63 in a state where this portion 71 overlaps with the first impact bar 81 and the inner front portion 63 (specifically, the front-side outer wall portion 63a) at a joint position of the first impact bar 81 to the door inner panel 61, which is not illustrated.

The rear-side reinforcement portion 72 is a patch member which is attached along the rear-side outer wall portion 64 and the rear-side connection wall portion 64c as shown in FIG. 3. That is, the rear-side reinforcement portion 72 is provided to straddle a ridgeline between the rear-side outer wall portion 64a and the rear-side connection wall portion 64c. The rear-side reinforcement portion 72 is, as shown in FIG. 5, provided to overlap with the front-side center-pillar flange 45 and the center-pillar side wall portion 44c of the center pillar 40 in the vehicle side view (i.e., when viewed from the vehicle width direction). Further, the rear-side reinforcement portion 72 is located at the same position, in the longitudinal direction, as the second floor cross member 47.

The rear-side reinforcement portion 72 is, as shown in FIGS. 3 and 8, provided to overlap with a lower-side end portion of the first impact bar 81 in the vehicle side view (i.e., when viewed from the vehicle width direction). The rear-side reinforcement portion 72 is welded to the inner rear portion 64 in a state where this portion 72 overlaps with the first impact bar 81 and the inner rear portion 64 (specifically, the rear-side outer wall portion 64a) at a joint position of the first impact bar 81 to the door inner panel 61, which is not illustrated.

The rear-side reinforcement portion 72 extends, as shown in FIG. 3, so as to include a position of the inner rear portion 64 which overlaps with the central part 40a, in the vertical direction, of the center pillar 40. Specifically, it extends up to a position of an upper-side end portion of the door latch 5b in the present embodiment.

Figure 9:
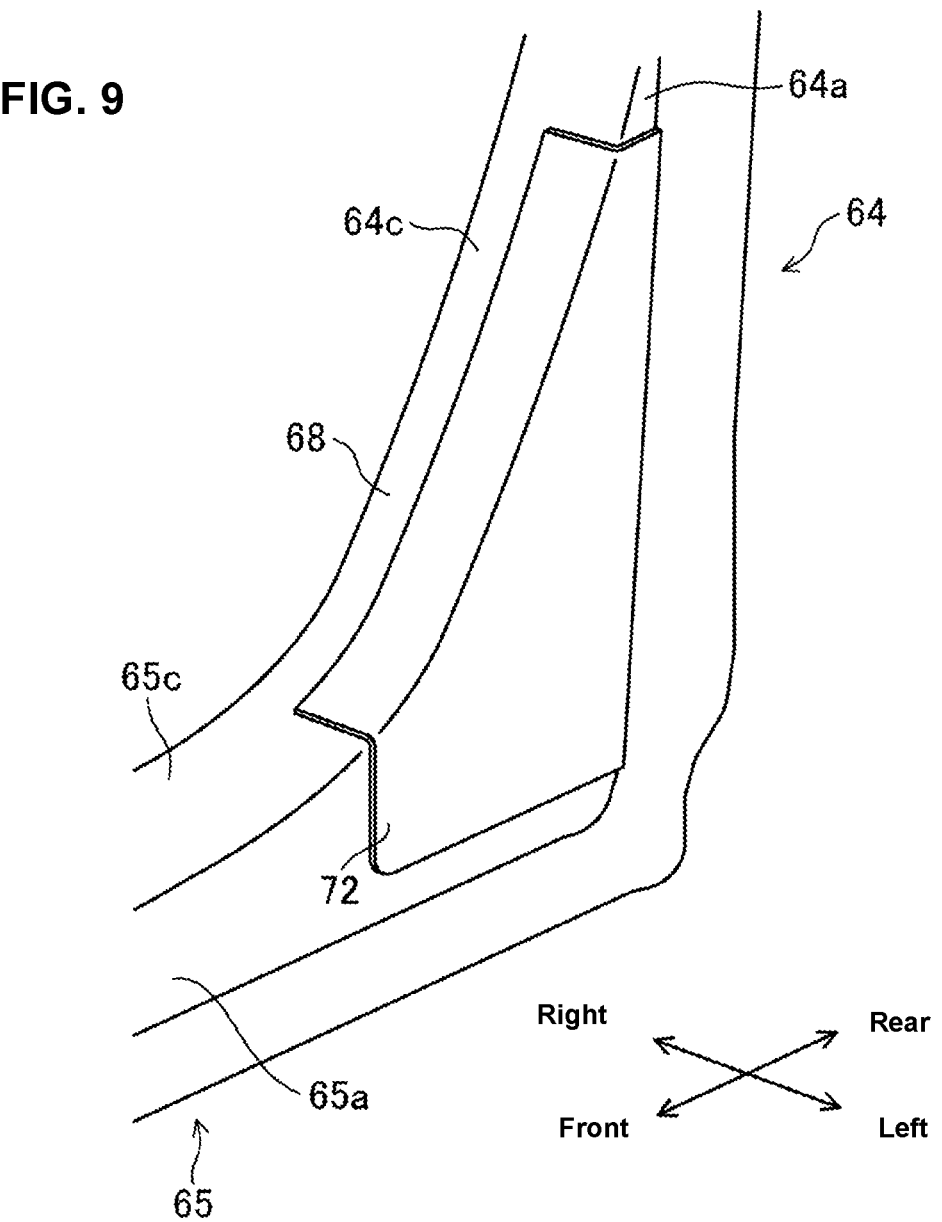
FIG. 9 is a perspective view of a curved portion of a door inner panel, when viewed from a front left side.

The rear-side reinforcement portion 72 is of a curved shape such that it extends along a curve of the curved portion 68 as shown in FIG. 9.

The lower-side reinforcement portion 73 is, as shown in FIG. 4, configured to have a U-shaped cross section which is opened to the right side and to form a closed-cross section cooperatively with the side sill 10. Specifically, the lower-side reinforcement portion 73 is joined to the lower-side outer wall portion 65a and the lower-side connection wall portion 65c such that this portion 73 straddles the ridgeline between the lower-side outer wall portion 65a and the lower-side connection wall portion 65c and thereby the closed-cross section is formed. The lower-side reinforcement portion 73 is provided to overlap with the upper-side side-sill flange 13 and the side-sill side wall portion 12c of the side sill 10 in the vehicle side view (i.e., when viewed from the vehicle width direction). Further, the lower-side reinforcement portion 73 is provided to overlap with the first floor cross member 17 in the vehicle side view (i.e., when viewed from the vehicle width direction).

The door outer panel 62 determines an outer shape (contour) of the front side door 5, when viewed from an outward side, in the vehicle width direction, of the vehicle 1 as shown in FIG. 1.

Herein, the rear side door 6 also comprises plural reinforcement portions similarly to the front side door 5. These reinforcement portions are provided at respective portions of a door panel portion of the rear side door 6 which overlap with the center pillar 40, the wheel arch 50, and the side sill 10 in the vehicle side view (i.e., when viewed from the vehicle width direction).

Herein, the vehicle-body structure of the vehicle 1 is required to suppress the center pillar 40 from coming into the cabin as much as possible in the vehicle side view. Further, the weight reduction of the vehicle 1 is recently required from viewpoints of the fuel economy and the like. Therefore, it is necessary to compatibly attain the further weight reduction of the vehicle and increasing of the amount of absorption of the collision load in the vehicle side collision.

If the frame members are arranged between the door inner panel 61 and the door outer panel 62 like a conventional side door, the transmission efficiency of the load may be improved. However, the weight of the vehicle improperly is increased in this case. Therefore, some structure without any frame member arranged may be required.

Herein, according to the present embodiment of the invention, buckling deformation of the door inner panel 61 is so suppressed in the vehicle side collision by providing the reinforcement portions 71-73 at the door inner panel 61 as described above that the collision load can be efficiently transmitted to the vehicle-body frame member 2. Hereafter, a motion of the door panel portion 60 in the vehicle side collision will be described referring to FIGS. 10-14. Herein, FIGS. 10-14 show a case where a collision object A collides with the left-side part of the vehicle 1. Further, FIGS. 10-14 show the motion of the door panel portion 60 of the front side door 5, omitting illustration of a motion regarding the rear side door 6.

Figure 10:
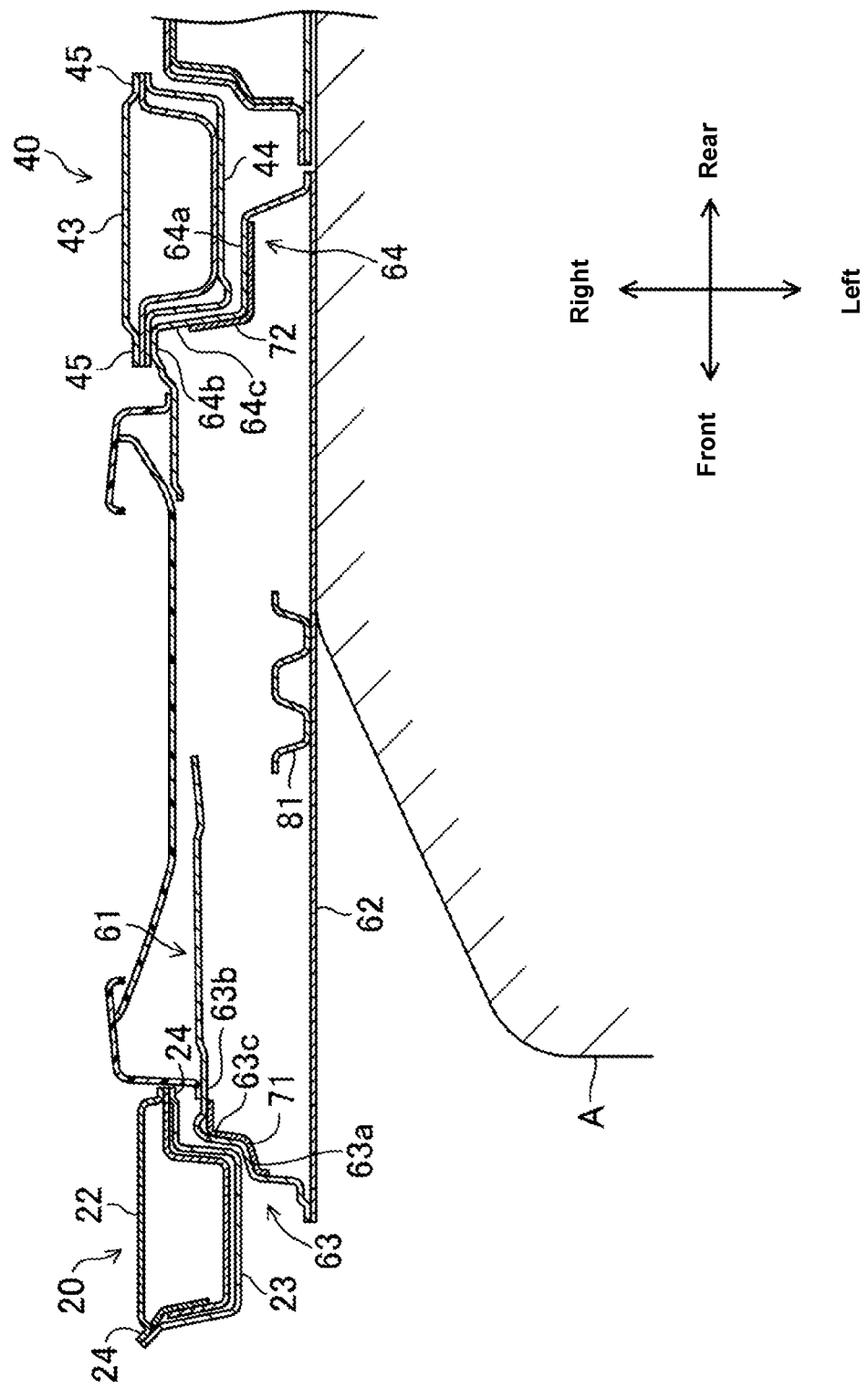
FIG. 10 is a plan view showing a state where a collision object contacts the front side door in a vehicle side collision.

A situation where the collision object A moves toward the center pillar 40 and then contacts the left-side part of the vehicle 1 as shown in FIG. 10 is assumed here. Herein, the inner rear portion 64 is in a state where it is interposed between the center pillar 40 and the collision object A.

Figure 11:
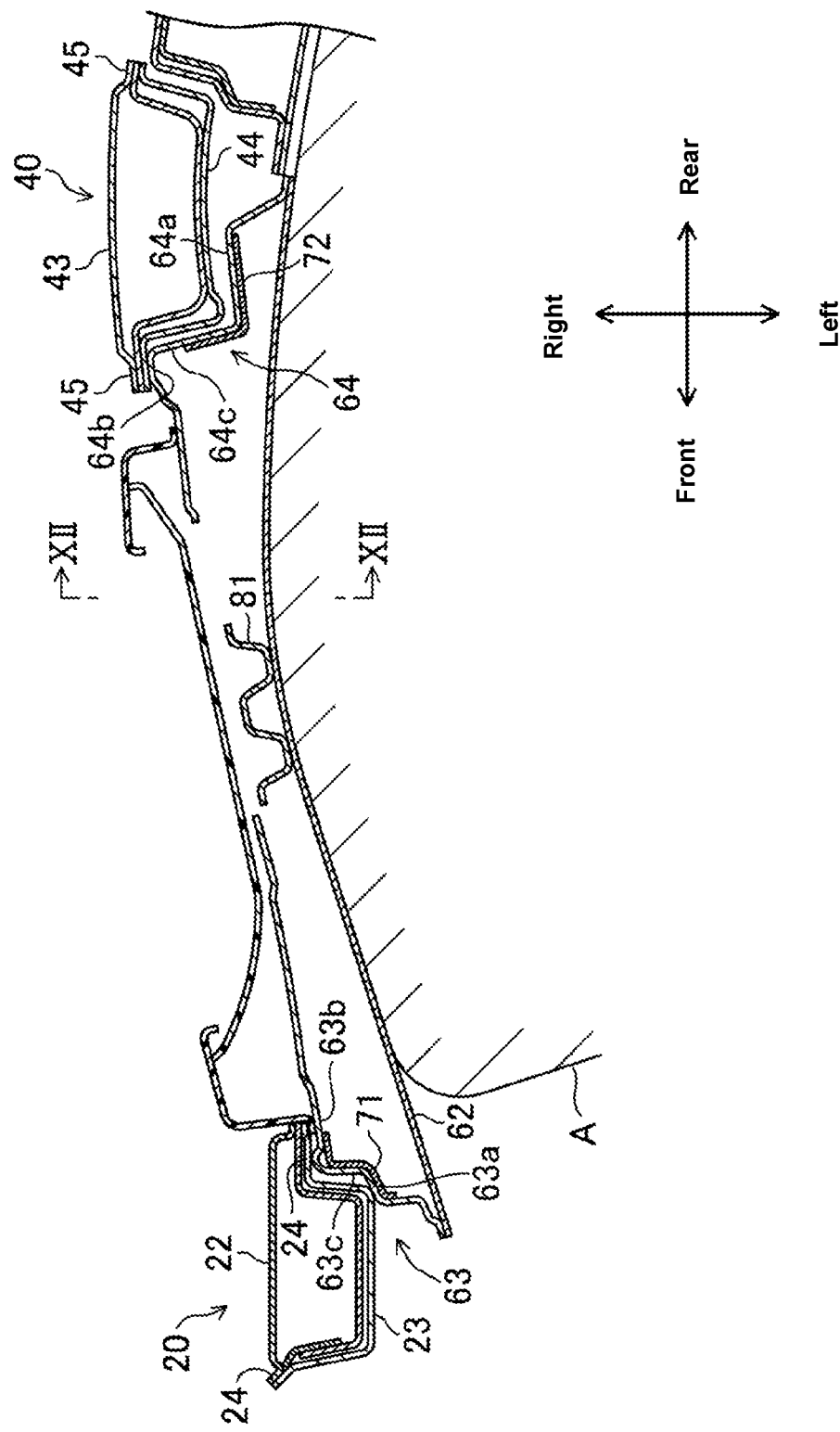
FIG. 11 is a plan view showing a state where the collision object comes into a cabin from the state shown in FIG. 10.

When the collision object A comes in as shown in FIG. 11 from the state shown in FIG. 10, a load directed to a cabin inside (to the right side in this figure) is inputted (applied). Herein, the front side door 5 is moved (pushed) to the right side and deformed such that its rear side is positioned at the right side. Accordingly, as shown in FIG. 11, the inner front portion 63 and the rear-side hinge-pillar flange 24 of the hinge pillar 20 come to contact each other, and the inner rear portion 64 and the front-side center-pillar flange 45 of the center pillar 40 come to contact each other. At this moment, the inner front portion 63 transmits the collision load to the hinge pillar 20 and also receives a reaction load from the hinge pillar 20. Further, the inner front portion 63 receives a force directed to the inside, in the surface direction, of the door inner panel 61 (to the rear side in this figure) through this coming-in of the collision object A. Meanwhile, the inner rear portion 64 transmits the collision load to the center pillar 40 and also receives a reaction load from the center pillar 40.

Figure 12:
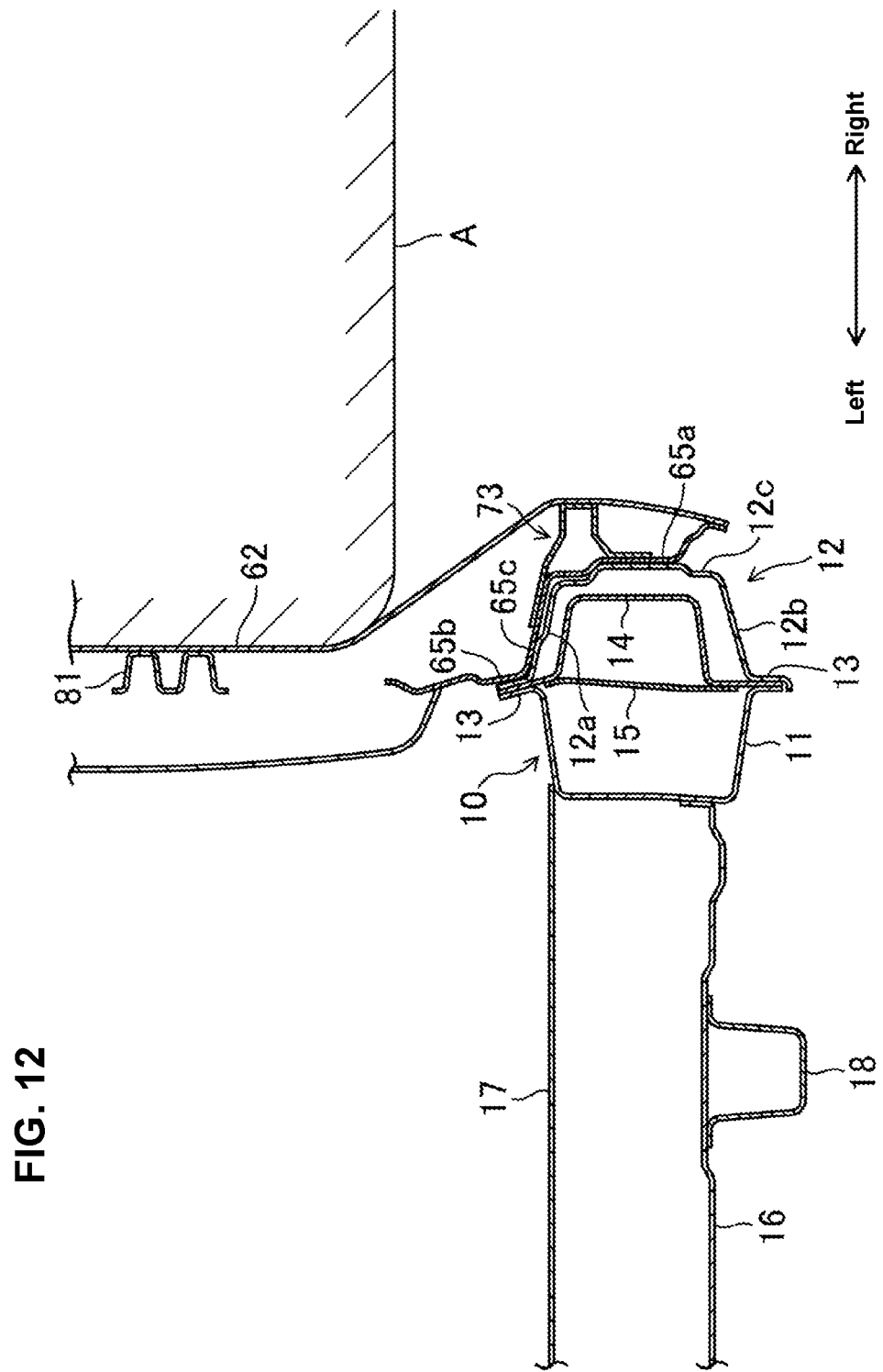
FIG. 12 is a sectional view taken along line XII-XII of FIG. 11.

Further, as shown in FIG. 12, the inner lower portion 65 comes to contact the upper-side side-sill flange 13 and the side-sill side wall portion 12c of the side sill 10. Accordingly, the inner lower portion 65 transmits the collision load to the side sill 10 and also receives a reaction force from the side sill 10. Further, the inner lower portion 65 receives the force directed to the inside, in the surface direction, of the door inner panel 61 (to the upper side in this figure) through the coming-in of the collision object A.

Also, the widow frame portion 67 comes to contact the roof side rail 31, which is not illustrated. Accordingly, the widow frame portion 67 transmits the collision load to the roof side rail 31 and also receives a reaction force from the roof side rail 31. Further, the roof side rail 31 receives the force directed to the inside, in the surface direction, of the door inner panel 61 (to the lower side in this figure) through the coming-in of the collision object A.

Figure 13:
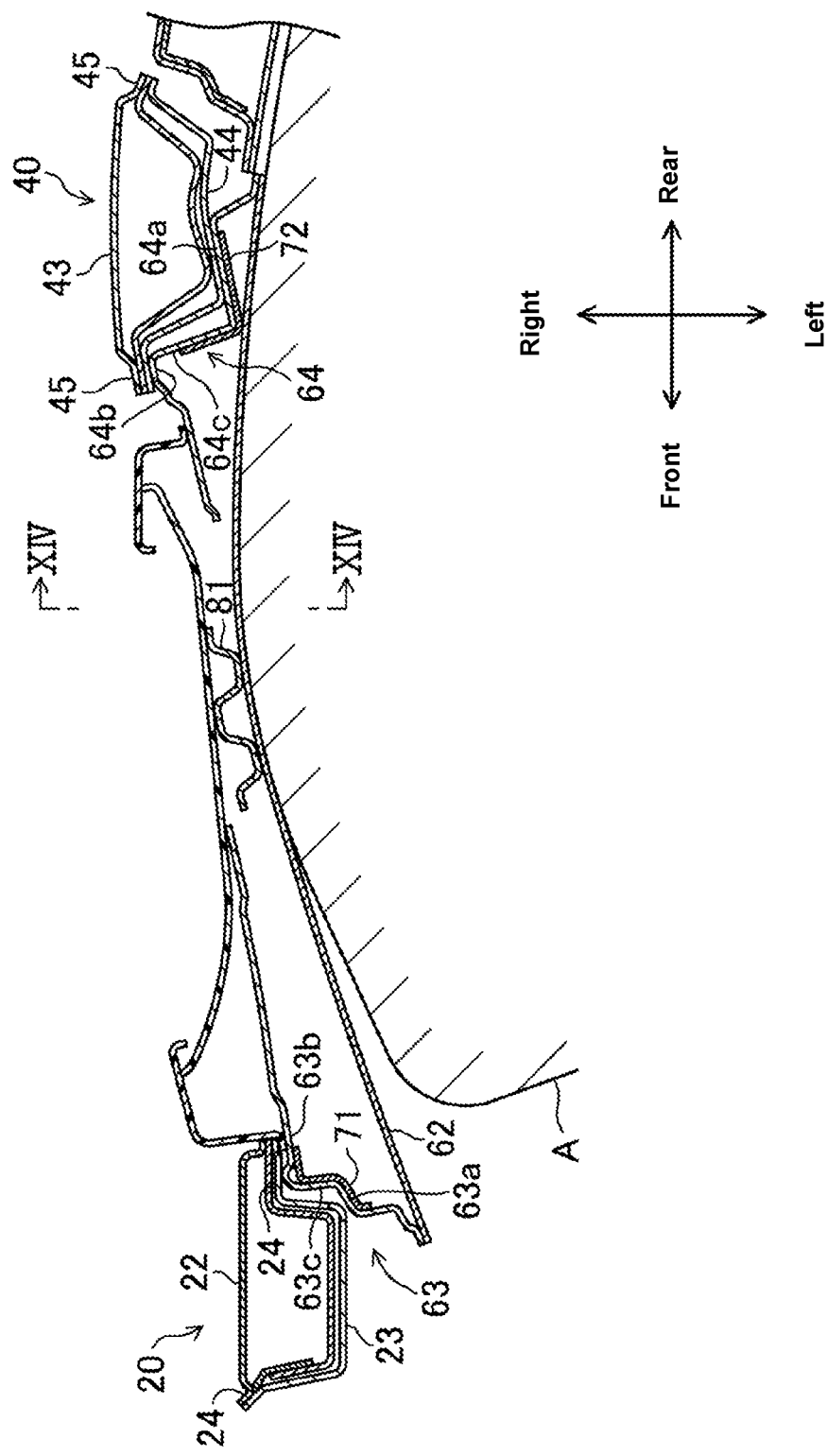
FIG. 13 is a plan view showing a state where the collision object further comes into the cabin from the state shown in FIG. 11.

A situation where the collision object A further comes in to the right side from the state of FIG. 11 as shown in FIG. 13 is assumed here. The inner front portion 63 is suppressed from being deformed by the front-side reinforcement portion 71. Specifically, the front-side reinforcement portion 71 suppresses the front-side connection wall portion 63c from being bent (bucking deformation) to the inside, in the surface direction, of the door inner panel 61. Thereby, the front-side outer wall portion 63a is suppressed from being deformed to the inside, in the surface direction, of the door inner panel 61. Consequently, the inner front portion 63 maintains its contact state with the hinge pillar 20. Meanwhile, since the inner rear portion 64 is interposed between the collision object A and the center pillar 40 in this collision situation, a contact state of the inner rear portion 64 and the center pillar 40 is maintained. Thus, the transmission of the collision load from the inner front portion 63 to the hinge pillar 20 can be maintained and also the transmission of the collision load from the inner rear portion 64 to the center pillar 40 can be maintained.

As described above, since the front-side reinforcement portion 71 overlaps with the instrument-panel member 26 in the vehicle side view (i.e., when viewed from the vehicle width direction), the collision load of the vehicle side collision is transmitted from the front-side reinforcement portion 71 to the instrument-panel member 26 by way of the hinge pillar 20. Since it extends in the vehicle width direction, the instrument-panel member 26 can receive the collision load properly. Further, since the rear-side reinforcement portion 72 is located at the same position, in the vehicle longitudinal direction, as the second floor cross member 47 as described above, the collision load of the vehicle side collision is transmitted from the rear-side reinforcement portion 72 to the second floor cross member 47 by way of the center pillar 47 and the side sill 10. Herein, since it extends in the vehicle width direction, the second floor cross member 47 can receive the collision load properly.

Further, since the rear-side reinforcement portion 72 extends so as to include the position of the inner rear portion 64 which overlaps with the central part 40a, in the vertical direction, of the center pillar 40, the collision load is transmitted to the upper-side part of the center pillar. Thereby, the collision load can be dispersed to a whole part of the center pillar 40. Moreover, the collision load can be transmitted to the roof side rail 31 by way of the center pillar 40 as well.

Figure 14:
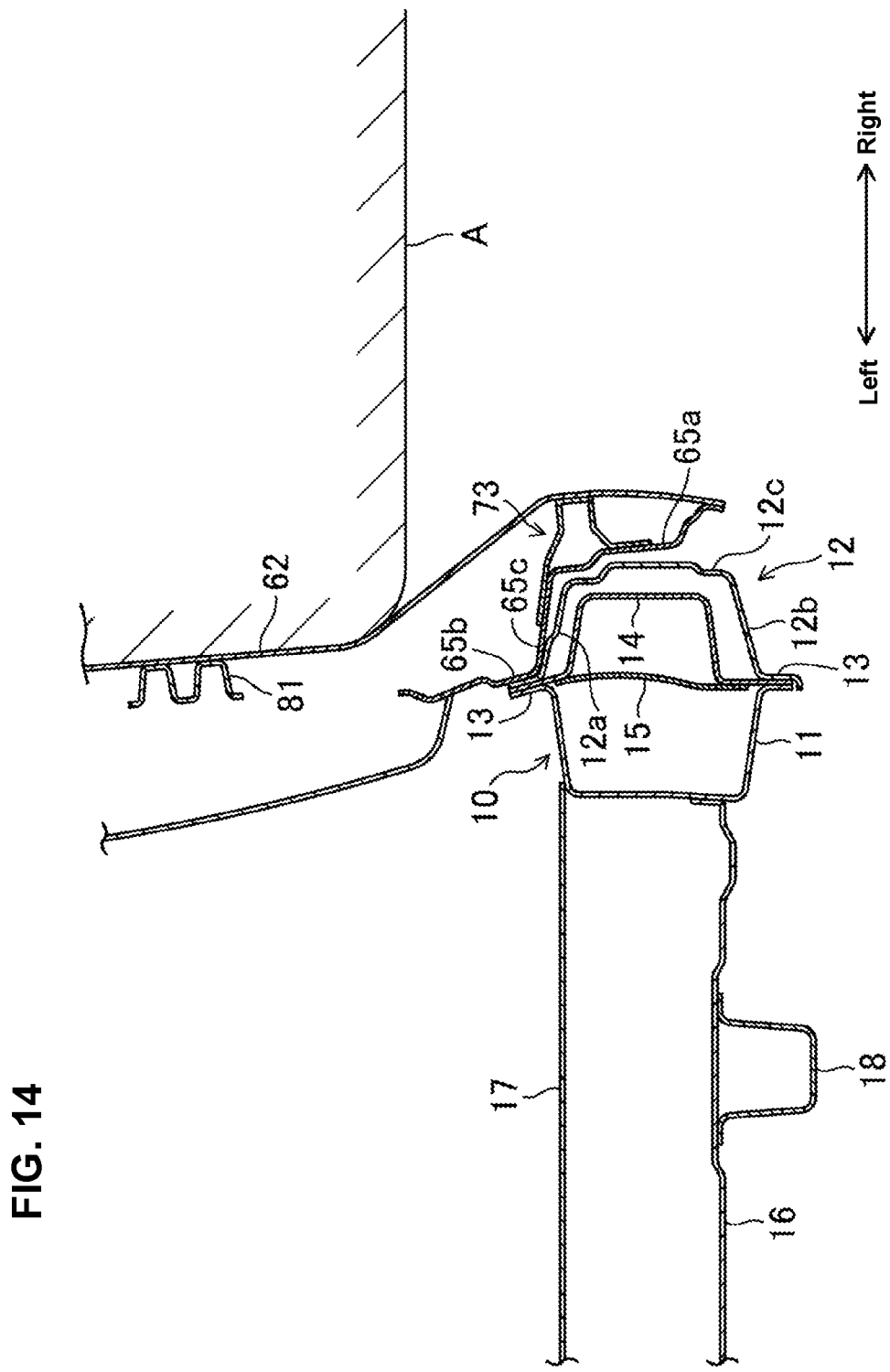
FIG. 14 is a sectional view taken along line XIV-XIV of FIG. 13.

Meanwhile, as shown in FIG. 14, the inner lower portion 65 is suppressed from being deformed by the lower-side reinforcement portion 73. Specifically, the lower-side reinforcement portion 73 suppresses the lower-side connection wall portion 65c from being bent (buckling deformation) to the inside, in the surface direction, of the door inner panel 61. Thereby, the lower-side outer wall portion 65a is suppressed from being deformed to the inside, in the surface direction, of the door inner panel 61. Consequently, the inner lower portion 65 maintains its contact state with the side sill 10. Thus, the transmission of the collision load from the inner lower portion 65 to the side sill 10 can be maintained.

As described above, since the lower-side reinforcement portion 73 overlaps with the first floor cross member 17 in the vehicle side view (i.e., when viewed from the vehicle width direction), the collision load of the vehicle side collision is transmitted from the lower-side reinforcement portion 73 to the first floor cross member 17 by way of the side sill 10. Since it extends in the vehicle width direction, the first floor cross member 17 can receive the collision load properly.

As described above, in the vehicle side collision, the collision load of the vehicle side collision is transmitted from the front side door 5 to the vehicle-body frame member 2, being dispersed to a whole part of the door panel portion 60, by maintaining the connection state with the peripheral part of the door panel portion 60. Thereby, the amount of absorption of the collision load can be increased. Further, since the collision load of the vehicle side collision is suppressed from being concentrated at the center pillar 40, the center pillar 40 can be suppressed from coming into the cabin as much as possible.

Thus, according to the present embodiment, the vehicle-body frame member 2 comprises the side sill 10, the front side door 5 comprises the door panel portion 60 and the reinforcement portions 71-73 provided at the peripheral part of the door panel portion 60 such that the reinforcement portions 71-73 overlap with the vehicle-body frame member 2 in the vehicle side view (i.e., when viewed from the vehicle width direction), the peripheral part of the door panel portion 60 comprises the inner lower portion 65 which overlaps with the side sill 10 in the vehicle side view, and the reinforcement portions 71-73 are provided at the three side-portions of the peripheral part of the door panel portion 60 which are continuous and include the inner lower portion 65. Accordingly, even if the door panel portion 60 receives the collision load and the reaction load from the vehicle-body frame member 2 in the vehicle side collision, the deformation of the peripheral part of the door panel portion 60 is suppressed by the reinforcement portions 71-73 in a quadrangular area including the three side-portions (the inner front portion 63, the inner rear portion 64, and the inner lower portion 65) which are continuous and include the inner lower portion 65. Accordingly, the door panel portion 60 is suppressed from coming into the cabin. Therefore, the door panel portion 60 remains contacting with the vehicle-body frame member 2. Consequently, the collision load of the vehicle side collision is transmitted from the front side door 5 to the vehicle-body frame member 2, being dispersed to a whole part of the door panel portion 60. Accordingly, the weight reduction of the vehicle 1 and increasing of the amount of absorption of the collision load in the vehicle side collision can be compatibly attained.

Further, in the present embodiment, the vehicle-body frame member 2 comprises the first floor cross member 17 provided at the position which overlaps with the side sill 10 in the vehicle side view (i.e., when viewed from the vehicle width direction) and extending in the vehicle width direction, and the lower-side reinforcement portion 73 is configured to overlap with the first floor cross member 17 in the vehicle side view (i.e., when viewed from the vehicle width direction). That is, a portion of the side sill 10 which overlaps with the first floor cross member 17 has high rigidity against the collision load applied from the vehicle side. Accordingly, if the lower-side reinforcement 73 is configured to overlap with the first floor cross member 17 in the vehicle side view, the collision load of the vehicle side collision can be effectively transmitted to the vehicle-body frame member 2. Consequently, the amount of absorption of the collision load in the vehicle side collision can be further increased.

Moreover, in the present embodiment, the vehicle-body frame member 2 comprises the hinge pillar 20 and the instrument-panel member 26 provided at the position which overlaps with the hinge pillar 20 in the vehicle side view (i.e., when viewed from the vehicle width direction) and extending in the vehicle width direction, the peripheral part of the door panel portion 60 comprises the inner front portion 63 which overlaps with the hinge pillar 20 and the instrument-panel member 26 in the vehicle side view (i.e., when viewed from the vehicle width direction), and the reinforcement portions 71-73 are provided at the three side-portions of the peripheral part of the door panel portion 60 (the inner front portion 63, the inner rear portion 64, and the inner lower portion 65) which are continuous and include the inner lower portion 65 and the inner front portion 63. Thus, the front-side reinforcement portion 71 overlaps with the instrument-panel member in the vehicle side view. A portion of the hinge pillar 20 which overlaps with the instrument-panel member 26 in the vehicle side view has high rigidity against the collision load applied from the vehicle side. Accordingly, if the front-side reinforcement portion 71 is configured to overlap with the instrument-panel member 26 in the vehicle side view, the collision load of the vehicle side collision can be effectively transmitted to the vehicle-body frame member 2. Consequently, the amount of absorption of the collision load in the vehicle side collision can be further increased.

Also, in the present embodiment, the vehicle-body frame member 2 comprises the center pillar 40, the peripheral part of the door panel portion 60 comprises the inner rear portion 64 which overlaps with the center pillar 40 in the vehicle side view (i.e., when viewed from the vehicle width direction), and the reinforcement portions 71-73 are provided at the three side-portions of the peripheral part of the door panel portion 60 (the inner front portion 63, the inner rear portion 64, and the inner lower portion 65) which are continuous and include the inner lower portion 65 and the inner rear portion 64. In the vehicle side collision, the collision object A often collides with an area of the vehicle including the center pillar 40. Therefore, according to the present embodiment where the rear-side reinforcement portion 72 is provided at the inner rear portion 64, deformation of the inner rear portion 64 in the vehicle side collision is suppressed. Thereby, the collision load can be received by the inner rear portion 64 and the inner lower portion 65 and transmitted to the vehicle-body frame member 2. Accordingly, even if the collision object A collides with the area of the vehicle including the center pillar 40, the collision load is suppressed from being concentrated at the center pillar 40. Thereby, the amount of absorption of the collision load in the vehicle side collision can be further increased.

Further, in the present embodiment, the inner rear portion 64 overlaps with the central part 40a, in the vertical direction, of the center pillar 40, and the rear-side reinforcement portion 72 extends so as to include the position of the inner rear portion 64 which overlaps with the central part 40a, in the vertical direction, of the center pillar 40. Thereby, the collision load of the vehicle side collision can be effectively transmitted to an upper-side part of the center pillar 40. Consequently, the amount of absorption of the collision load in the vehicle side collision can be more further increased.

Additionally, the front side door 5 further comprises the first impact bar 81 attached to the door panel portion 60 and extending in the vehicle longitudinal direction, and the reinforcement portion (the front-side reinforcement portion 71, the rear-side reinforcement portion 72) is configured to include an attachment portion of the first impact bar 81 to the door panel portion 60. Since the first impact bar 81 is provided, the collision load can be absorbed by deformation of the first impact bar 81 in the vehicle side collision. Meanwhile, the collision load tends to be concentrated at the attachment portion of the first impact bar 81 to the door panel portion 60. Therefore, by configuring the reinforcement portion to include the attachment portion of the first impact bar 81 to the door panel portion 60, deformation of the attachment portion can be suppressed even if the collision load is concentrated at the attachment portion. Thereby, the amount of absorption of the collision load in the vehicle side collision can be more further increased.

The present invention should not be limited to the above-described embodiment and any other modifications or improvements may be applied within the scope of a spirit of the present invention.

For example, while the reinforcement portions are respectively provided at the inner front portion 63, the inner rear portion 64, and the inner lower portion 65 in the above-described embodiment, these can be provided at any position of the three-side portions of the peripheral part of the door panel portion 60 which are continuous and include the inner lower portion 65. For example, the reinforcement portions may be provided at the inner front portion 63, the inner lower portion 65, and the window frame portion 67, or at the inner rear portion 64, the inner lower portion 65, and the window frame portion 67.

Further, while the reinforcement portions 71-73 are provided at the door inner panel 61 in the above-described embodiment, these portions may be provided at a peripheral portion of the door outer panel 62. In this case, deformation of the door outer panel 62 in the vehicle side collision is so suppressed that it is suppressed that the side door is pushed into the cabin, so that a connection state of the door panel portion 60 and the vehicle-body frame member 2 is maintained.

Further, while the case where the contact state of the door inner panel 61 and the vehicle-body frame member 2 is maintained in the vehicle side collision is described in the above-described embodiment, an engagement state of the door panel portion 60 and the vehicle-body frame member 2 may be maintained by providing catcher pins as the reinforcement portions 71-73.

Moreover, while the door inner panel 61 (the inner lower portion 65) forms the closed-cross section together with only the lower-side reinforcement portion 73 in the above-described embodiment, the front-side reinforcement portion 71 and the rear-side reinforcement portion 72 may respectively form a closed-cross section together with the door inner panel 61 similarly to the lower-side reinforcement portion 73.

On the contrary, the lower-side reinforcement portion 73 may be a patch member attached along the lower-side outer wall portion 65a, the lower-side inner wall portion 65b, and the lower-side connection wall portion 65c, similarly to the front-side reinforcement portion 71 and so on. Herein, the reinforcement portions 71-73 may be configured to be continuous along the inner front portion 63, the inner lower portion 65, and the inner rear portion 64.

Also, a part or a whole part of the reinforcement portions 71-73 may not be configured to be a separate member from the door inner panel 61. In this case, the reinforcement portions 71-73 can be configured by making the plate thickness of a portion of the door inner panel 61 which corresponds to the reinforcement portions 71-73 thicker than the other part of the door inner panel 61, for example.

What is claimed is:

1. A vehicle-body structure of a vehicle, comprising:
a vehicle-body frame member forming an opening portion for entrance at a vehicle side part; and
a side door provided so as to open and close the opening portion,
wherein
said vehicle-body frame member comprises a side sill, said side door comprises a door panel portion and a reinforcement portion provided at a peripheral part of the door panel portion such that the reinforcement portion overlaps with said vehicle-body frame member in a vehicle side view, the peripheral part of said door panel portion comprises a lower-side overlapping portion which overlaps with said side sill in the vehicle side view, and said reinforcement portion comprises a plurality of patch members disposed at three side-portions of the peripheral part of the door panel portion which are continuous and include said lower-side overlapping portion;
said vehicle-body frame member comprises a center pillar, and the peripheral part of said door panel portion comprises a center overlapping portion which overlaps with said center pillar in the vehicle side view;
the reinforcement portion comprises a rear-side reinforcement portion disposed along an inner rear portion of the door panel portion and a lower-side reinforcement portion disposed along the inner lower portion of the door panel portion;
the rear-side reinforcement portion overlaps with a frontside center-pillar flange of the center pillar and the center-pillar side wall portion of the center pillar in the vehicle side view; and
the lower-side reinforcement portion overlaps with an upper-side side-sill flange of the side sill and a side-sill side wall portion of the side sill in the vehicle side view.

2. The vehicle-body structure of the vehicle of claim 1, wherein said vehicle-body frame member comprises a floor cross member provided at a position which overlaps with said side sill in the vehicle side view and extending in a vehicle width direction, and said reinforcement portion is configured to overlap with said floor cross member in the vehicle side view.

3. The vehicle-body structure of the vehicle of claim 2, wherein said vehicle-body frame member comprises a hinge pillar and an instrument-panel member provided at a position which overlaps with said hinge pillar in the vehicle side view and extending in the vehicle width direction, the peripheral part of said door panel portion comprises a front-side overlapping portion which overlaps with said hinge pillar and said instrument-panel member in the vehicle side view, and said reinforcement portion is provided at three side-portions of the peripheral part of the door panel portion which are continuous and include said lower-side overlapping portion and said front-side overlapping portion.

4. The vehicle-body structure of the vehicle of claim 3, wherein said vehicle-body frame member comprises a center pillar, the peripheral part of said door panel portion comprises a center overlapping portion which overlaps with said center pillar in the vehicle side view, and said reinforcement portion is provided at three side-portions of the peripheral part of the door panel portion which are continuous and include said lower-side overlapping portion and said center overlapping portion.

5. The vehicle-body structure of the vehicle of claim 4, wherein said center overlapping portion overlaps with a central part, in a vertical direction, of said center pillar, and said reinforcement portion provided at said center overlapping portion extends so as to include a position of the center overlapping portion which overlaps with said central part, in the vertical direction, of the center pillar.

6. The vehicle-body structure of the vehicle of claim 5, wherein said side door further comprises an impact bar attached to said door panel portion and extending in a vehicle longitudinal direction, and said reinforcement portion is configured to include an attachment portion of said impact bar to the door panel portion.

7. The vehicle-body structure of the vehicle of claim 1, wherein said vehicle-body frame member comprises a hinge pillar and an instrument-panel member provided at a position which overlaps with said hinge pillar in the vehicle side view and extending in the vehicle width direction, the peripheral part of said door panel portion comprises a front-side overlapping portion which overlaps with said hinge pillar and said instrument-panel member in the vehicle side view, and said reinforcement portion is provided at three side-portions of the peripheral part of the door panel portion which are continuous and include said lower-side overlapping portion and said front-side overlapping portion.

8. The vehicle-body structure of the vehicle of claim 1, wherein said reinforcement portion is provided at three side-portions of the peripheral part of the door panel portion which are continuous and include said lower-side overlapping portion and said center overlapping portion.

9. The vehicle-body structure of the vehicle of claim 8, wherein said center overlapping portion overlaps with a central part, in a vertical direction, of said center pillar, and said reinforcement portion provided at said center overlapping portion extends so as to include a position of the center overlapping portion which overlaps with said central part, in the vertical direction, of the center pillar.

10. The vehicle-body structure of the vehicle of claim 1, wherein said side door further comprises an impact bar attached to said door panel portion and extending in a vehicle longitudinal direction, and said reinforcement portion is configured to include an attachment portion of said impact bar to the door panel portion.

11. A vehicle-body structure of a vehicle, comprising:
a vehicle-body frame member forming an opening portion for entrance at a vehicle side part; and
a side door provided so as to open and close the opening portion,
wherein
said vehicle-body frame member comprises a side sill, said side door comprises a door panel portion and a reinforcement portion provided at a peripheral part of the door panel portion such that the reinforcement portion overlaps with said vehicle-body frame member in a vehicle side view, the peripheral part of said door panel portion comprises a lower-side overlapping portion which overlaps with said side sill in the vehicle side view, and said reinforcement portion comprises a plurality of patch members disposed at three side-portions of the peripheral part of the door panel portion which are continuous and include said lower-side overlapping portion;

said vehicle-body frame member comprises a hinge pillar, and the peripheral part of said door panel portion comprises a front-side overlapping portion which overlaps with said hinge pillar in the vehicle side view;

the reinforcement portion comprises a front-side reinforcement portion disposed along an inner front portion of the door panel portion and a lower-side reinforcement portion disposed along the inner lower portion of the door panel portion;

the front-side reinforcement portion overlaps with a hinge-pillar side wall portion of a rear-side hinge pillar flange, and with the hinge pillar in the vehicle side view; and the lower-side reinforcement portion overlaps with an upper-side side-sill flange of the side sill and a side-sill side wall portion of the side sill in the vehicle side view.

12. A vehicle-body structure of a vehicle, comprising:

a vehicle-body frame member forming an opening portion for entrance at a vehicle side part; and a side door provided so as to open and close the opening portion, wherein said vehicle-body frame member comprises a side sill, said side door comprises a door panel portion and a reinforcement portion provided at a peripheral part of the door panel portion such that the reinforcement portion overlaps with said vehicle-body frame member in a vehicle side view, the peripheral part of said door panel portion comprises a lower-side overlapping portion which overlaps with said side sill in the vehicle side view, and said reinforcement portion comprises a plurality of patch members disposed at three side-portions of the peripheral part of the door panel portion which are continuous and include said lower-side overlapping portion;

said vehicle-body frame member comprises a center pillar, and the peripheral part of said door panel portion comprises a center overlapping portion which overlaps with said center pillar in the vehicle side view;

said vehicle-body frame member comprises a hinge pillar, and the peripheral part of said door panel portion comprises a front-side overlapping portion which overlaps with said hinge pillar in the vehicle side view;

the reinforcement portion comprises a front-side reinforcement portion disposed along an inner front portion of the door panel portion, a rear-side reinforcement portion disposed along an inner rear portion of the door panel portion, and a lower-side reinforcement portion disposed along the inner lower portion of the door panel portion;

the front-side reinforcement portion overlaps with a hinge-pillar side wall portion of a rear-side hinge pillar flange, and with the hinge pillar in the vehicle side view;

the rear-side reinforcement portion overlaps with a front-side center-pillar flange of the center pillar and the center-pillar side wall portion of the center pillar in the vehicle side view; and the lower-side reinforcement portion overlaps with an upper-side side-sill flange of the side sill and a side-sill side wall portion of the side sill in the vehicle side view.

* * * * *